(12) United States Patent
Koike et al.

(10) Patent No.: US 12,311,678 B2
(45) Date of Patent: May 27, 2025

(54) RECORDING METHOD AND RECORDING APPARATUS

(71) Applicant: SEIKO EPSON CORPORATION, Tokyo (JP)

(72) Inventors: Naoki Koike, Matsumoto (JP); Ippei Okuda, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 206 days.

(21) Appl. No.: 18/345,294

(22) Filed: Jun. 30, 2023

(65) Prior Publication Data

US 2024/0010007 A1  Jan. 11, 2024

(30) Foreign Application Priority Data

Jul. 5, 2022 (JP) .................. 2022-108271

(51) Int. Cl.
*B41J 2/21* (2006.01)
*C09D 11/322* (2014.01)

(52) U.S. Cl.
CPC ........... *B41J 2/2117* (2013.01); *C09D 11/322* (2013.01)

(58) Field of Classification Search
CPC .... B41J 2/2117; B41J 2202/21; B41J 2/2114; B41J 2/01; B41J 3/407; C09D 11/322; C09D 11/54; C09D 11/30; C09D 11/324; C09D 11/36; C09D 11/38; B41M 5/0047
See application file for complete search history.

(56) References Cited

U.S. PATENT DOCUMENTS

2015/0054883 A1* 2/2015 Okuda ................... C09D 11/40
524/556

FOREIGN PATENT DOCUMENTS

JP 2015-071738 A 4/2015

* cited by examiner

*Primary Examiner* — Bradley W Thies
(74) *Attorney, Agent, or Firm* — Harness, Dickey & Pierce, P.L.C.

(57) ABSTRACT

A recording method includes a white ink attachment step, in which a white ink composition containing a white colorant is attached to a recording medium; a non-white ink attachment step, in which a non-white ink composition containing a non-white colorant is attached to overlap the attached white ink composition; a first treatment liquid attachment step, accompanying the white ink attachment step and in which a treatment liquid containing a flocculant is attached to the recording medium; and a second treatment liquid attachment step, accompanying the non-white ink attachment step and in which a treatment liquid containing a flocculant is attached to the recording medium. The white ink composition experiences a five-fold or greater increase in viscosity when mixed with a 7% by mass aqueous solution of calcium formate in a ratio by mass of 10:1, the white ink composition to the aqueous solution of calcium formate. The attachment density of the treatment liquid in the second treatment liquid attachment step is lower than that in the first treatment liquid attachment step.

16 Claims, 5 Drawing Sheets

RECORDING METHOD AND RECORDING APPARATUS

The present application is based on, and claims priority from JP Application Serial Number 2022-108271, filed Jul. 5, 2022, the disclosure of which is hereby incorporated by reference herein in its entirety.

BACKGROUND

1. Technical Field

The present disclosure relates to a recording method and a recording apparatus.

2. Related Art

High-resolution image recording by a recording method using a treatment liquid has been studied in various fields. Researchers have also been attempting to improve image visibility by printing white and non-white images on top of each other.

For example, JP-A-2015-071738 discloses an ink set that includes a reaction liquid containing a flocculant, a first ink containing a white colorant, and a second ink containing a non-white colorant. When this ink set is used, the reaction liquid, the first ink, and the second ink are attached in this order to a recording medium to overlap each other.

Attempts to increase the reactivity of the white ink composition with the treatment liquid for higher quality of the image formed by the white ink composition layer have ended up affecting the quality of the image formed by the non-white ink composition; much of the flocculant in the reaction liquid is consumed in flocculating ingredient(s) in the white ink composition, and ingredient(s) in the non-white ink composition cannot react with the flocculant sufficiently. There is a need for a recording method in which both white and non-white ink compositions form images of good quality.

SUMMARY

According to an aspect of the present disclosure, a form of a recording method includes a white ink attachment step, in which a white ink composition containing a white colorant is attached to a recording medium; a non-white ink attachment step, in which a non-white ink composition containing a non-white colorant is attached to overlap the attached white ink composition; a first treatment liquid attachment step, accompanying the white ink attachment step and in which a treatment liquid containing a flocculant is attached to the recording medium; and a second treatment liquid attachment step, accompanying the non-white ink attachment step and in which a treatment liquid containing a flocculant is attached to the recording medium, wherein the white ink composition experiences a five-fold or greater increase in viscosity when mixed with a 7% by mass aqueous solution of calcium formate in a ratio by mass of 10:1, the white ink composition to the aqueous solution of calcium formate; and an attachment density of the treatment liquid in the second treatment liquid attachment step is lower than an attachment density of the treatment liquid in the first treatment liquid attachment step.

According to an aspect of the present disclosure, a form of a recording apparatus is one with which the above recording method is implemented, the apparatus including an attachment mechanism with which the white ink attachment step is performed; an attachment mechanism with which the non-white ink attachment step is performed: an attachment mechanism with which the first treatment liquid attachment step is performed; and an attachment mechanism with which the second treatment liquid attachment step is performed.

DESCRIPTION OF EXEMPLARY EMBODIMENTS

Figure 1:
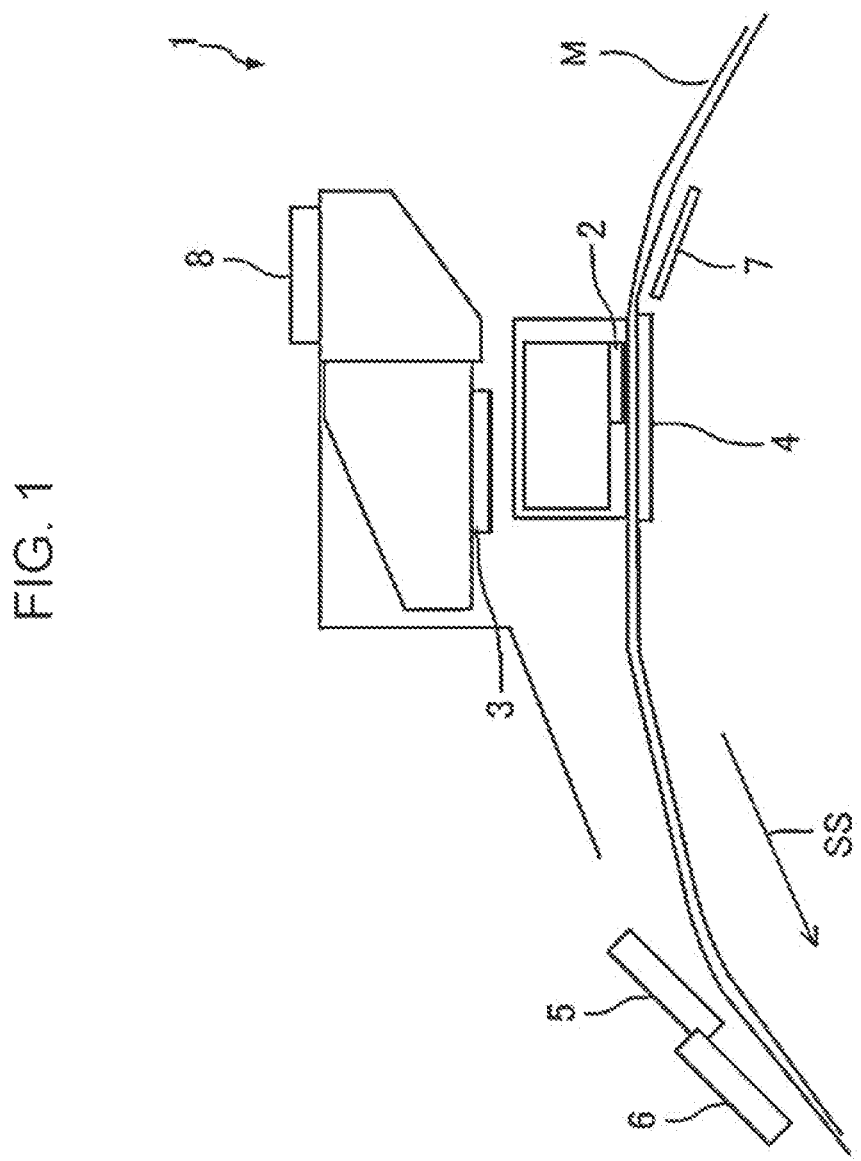
FIG. 1 is a schematic view of an example of an ink jet recording apparatus that can be used in a recording method according to an embodiment.

Embodiments of the present disclosure will now be described. The following embodiments are descriptions of examples of the disclosure. The disclosure is never limited to these embodiments and includes variations implemented within the gist of the disclosure. Not all the elements, features, or configurations described below are essential to the disclosure.

1. Recording Method

A recording method according to an embodiment includes a white ink attachment step, in which a white ink composition containing at least one white colorant is attached to a recording medium; a non-white ink attachment step, in which a non-white ink composition containing a non-white colorant is attached to overlap the attached white ink composition; a first treatment liquid attachment step, accompanying the white ink attachment step and in which a treatment liquid containing a flocculant is attached to the recording medium; and a second treatment liquid attachment step, accompanying the non-white ink attachment step and in which a treatment liquid containing a flocculant is attached to the recording medium. The white ink composition experiences a five-fold or greater increase in viscosity when mixed with a 7% by mass aqueous solution of calcium formate in a ratio by mass of 10:1, the white ink composition to the aqueous solution of calcium formate, and the attachment density of the treatment liquid in the second treatment liquid attachment step is lower than that of the treatment liquid in the first treatment liquid attachment step.

1.1. White Ink Attachment Step

The white ink attachment step is a step in which a white ink composition is attached to a recording medium. The white ink composition will now be described. The method for attachment to the recording medium and other details will be described later.

The white ink composition can be any ink as long as it is a water-based ink and contains at least one white colorant.

An example of a water-based ink is an ink containing, for example, a solvent component that can evaporate besides water. A water-based ink, furthermore, may be a water-based resin ink, which contains a resin. Once such an ink adheres to a recording medium, the solvent component(s) dries and evaporates out of the ink. Ingredients including the colorant are left on the recording medium, effecting recording.

1.1.1. White Colorant(s)

The white ink composition contains at least one white colorant. Examples of white colorants include metal compounds, such as metal oxides, barium sulfate, and calcium carbonate. Examples of metal oxides include titanium dioxide, zinc oxide, silica, alumina, and magnesium oxide. The white colorant may be particles having a hollow structure, and the particles having a hollow structure can be known ones.

Of these white colorants listed by way of example, it is particularly preferred to use titanium dioxide because it has good whiteness and good abrasion resistance. One white colorant may be used alone, or two or more may be used in combination.

The average particle diameter by volume (D50) (also referred to as "volume-average particle diameter") of the white colorant is set to be greater than that of inorganic fine particles, which will be described later. Preferably, the volume-average particle diameter of the white colorant is 30.0 nm or more and 600.0 nm or less, more preferably 100.0 nm or more and 500.0 nm or less, even more preferably 150.0 nm or more and 400.0 nm or less. When the volume-average particle diameter of the white colorant is in these ranges, the particles do not settle down easily, and this helps achieve good dispersion stability. In such a case it is also unlikely that events like nozzle clogging occur when the ink composition is used with an ink jet recording apparatus. White-colorant(s) having a volume-average particle diameter in these ranges, furthermore, contributes sufficiently to improving image visibility.

The volume-average particle diameter of the white colorant can be measured using a particle size distribution analyzer. An example of a particle size distribution analyzer is one that measures particle size distribution by dynamic light scattering (e.g., "Nanotrac" analyzers, MicrotracBEL). D50 is used as the volume-average particle diameter.

As used herein, the term "white" in the context of a white ink composition, a white colorant, etc., does not only refer to perfect white but also includes chromatic or achromatic colors and glossy colors as long as they can be visually perceived as white. Inks and pigments called by or sold with a name that suggests the ink or pigment is a white one are also "white" inks and pigments.

More quantitatively, "white" includes not only colors in which the record has, for example, an $L^*$ in CIELAB of 100, but also colors in which the record has an $L^*$ of 60 or greater and 100 or less with each of $a^*$ and $b^*$ within ±10.

More specifically, it is preferred that the white ink composition, for example, be one that gives, when applied to a transparent film recording medium to cover the surface of the recording medium sufficiently, a record whose lightness ($L^*$) and colors ($a^*$ and $b^*$) in the recorded area as measured using a CIELAB spectrophotometer are in the above ranges. The attachment density of a record made with ink enough to cover the surface of the recording medium is, for example, 15 mg/inch$^2$. More preferably, $80 \leq L^* \leq 100$, $-4.5 \leq a^* \leq 2$, and $-10 \leq b^* \leq 2.5$. An example of a transparent film recording medium is LAG JET E-1000ZC (Lintec). An example of a CIELAB-compliant spectrophotometer is Spectrolino (trade name, GretagMacbeth), and the color profile is measured by setting the measurement parameters of this analyzer as follows: light source, D50; field of view, 2°; density, DIN NB; white balance, Abs; filter, No; measurement mode, Reflectance.

A typical example of a white colorant is titanium dioxide. Examples include TIPAQUE CR-50-2, CR-57, CR-58-2, CR-60-2, CR-60-3, CR-Super-70, CR-90-2, CR-95, CR953, PC-3, PF-690, PF-691, PF-699, PF-711, PF-728, PF-736, PF-737, PF-739, PF-740, PF-742, R-980, and UT-771 (all available from Ishihara Sangyo Kaisha, Ltd.).

Preferably, the white colorant content (on a solids basis) of the white ink composition is 0.5% by mass or more and 20.0% by mass or less, more preferably 1.0% by mass or more and 20.0% by mass or less, even more preferably 3.0% by mass or more and 15.0% by mass or less, still more preferably 7.0% by mass or more and 12.0% by mass or less of the total mass of the white ink composition. When the white colorant content is in these ranges, the finished image will achieve sufficiently high visibility.

In the recording method according to this embodiment, the functions of the white colorant include masking the background of the image and enhancing the visibility of the finished image. The white colorant content can be low when the white ink composition is used to enhance image visibility, compared with when the purpose is background masking. When the white ink composition is used to enhance the visibility of the image, therefore, the finished image will achieve sufficiently high visibility, and it is easier to give the white colorant good dispersion stability; the manufacturer can make the white colorant less likely to precipitate. When such factors are considered, it is preferred that the white colorant content of the white ink composition be in the above ranges, preferably 10.0% by mass or less, for the upper limit.

It is desirable that the white colorant disperse stably in its dispersion medium, and to that end a dispersant may be used to disperse the white colorant. The dispersant can be, for example, a resin dispersant and is selected from ones that help achieve good dispersion stability of the white colorant in the white ink composition containing it. The white colorant, furthermore, may be used as a self-dispersible pigment by modifying the surface of particles of a pigment by oxidizing or sulfonating the surface, for example with ozone, hypochlorous acid, or fuming sulfuric acid.

Examples of resin dispersants (dispersant resins) include water-soluble resins, including (meth)acrylic resins and their salts, such as poly(meth)acrylic acid, (meth)acrylic acid-acrylonitrile copolymers, (meth)acrylic acid-(meth)acrylate copolymers, vinyl acetate-(meth)acrylate copolymers, vinyl acetate-(meth)acrylic acid copolymers, and vinyl naphthalene-(meth)acrylic acid copolymers; styrene resins and their salts, such as styrene-(meth)acrylic acid copolymers, styrene-(meth)acrylic acid-(meth)acrylate copolymers, styrene-α-methylstyrene-(meth)acrylic acid copolymers, styrene-α-methylstyrene-(meth)acrylic acid-(meth)acrylate copolymers, styrene-maleic acid copolymers, and styrene-maleic anhydride copolymers; urethane resins (i.e., polymeric compounds (resins) incorporating a urethane linkage, which is formed when an isocyanate group reacts with a hydroxyl group), whether linear-chain or branched and whether crosslinked or not, and their salts; polyvinyl alcohols; vinyl naphthalene-maleic acid copolymers and their salts; vinyl acetate-maleate copolymers and their salts; and vinyl acetate-crotonic acid copolymers and their salts. Of these, copolymers of a monomer having a hydrophobic functional group and a monomer having a hydrophilic functional group and polymers made of a monomer having both hydrophobic and hydrophilic functional groups are particularly preferred. A copolymer can be in any form, i.e., any of a random, block, alternating, or graft copolymer.

Examples of commercially available styrene resin dispersants include X-200, X-1, X-205, X-220, and X-228 (Seiko PMC), SN-DISPERSANT® 6100 and 6110 (San Nopco Ltd.), Joncryl 67, 586, 611, 678, 680, 682, and 819 (BASF), DISPERBYK-190 (BYK Japan KK), and N-EA137, N-EA157, N-EA167, N-EA177, N-EA197D, N-EA207D, and E-EN10 (DKS).

Examples of commercially available acrylic resin dispersants include BYK-187, BYK-190, BYK-191, BYK-194N, and BYK-199 (BYK Japan KK) and Aron A-210, A6114, AS-1100, AS-1800, A-30SL, A-7250, and CL-2 (Toagosei Co., Ltd.).

Examples of commercially available urethane resin dispersants include BYK-182, BYK-183, BYK-184, and BYK-185 (BYK Japan KK), TEGO Disperse 710 (Evonik Tego Chemie), and Borchi® Gen 1350 (OMG Borchers).

One dispersant may be used alone, or two or more may be used in combination. Preferably, the total amount of dispersants is 0.1 parts by mass or more and 30 parts by mass or less, more preferably 0.5 parts by mass or more and 25 parts by mass or less, even more preferably 1 part by mass or more and 20 parts by mass or less, still more preferably 1.5 parts by mass or more and 15 parts by mass or less per 50 parts by mass of the white colorant. A dispersant content of 0.1 parts by mass or more per 50 parts by mass of the white colorant helps further improve the dispersion stability of the white colorant. When the dispersant content is 30 parts by mass or less per 50 parts by mass of the white colorant, the viscosity of the resulting dispersion remains low.

Of these dispersants listed by way of example, it is particularly preferred that the dispersant(s) be at least one selected from anionic dispersant resins. In that case, it is more preferred that the weight-average molecular weight of the dispersant(s) be 500 or greater. Preferably, the weight-average molecular weight of the dispersant(s) is 5000 or greater and 100000 or less, more preferably 10000 or greater and 50000 or less.

Using such resin dispersant(s) as dispersant(s) makes the dispersion and aggregation of the white pigment even better, thereby helping achieve even better dispersion stability and even better quality of the finished image. The use of such resin dispersant(s) is also advantageous because in that case it is easier to ensure that the thickening factor, described later, of the white ink composition is 5 or greater.

An anionic dispersant resin is a resin that has an anionic functional group and therefore is anionic. Examples of anionic functional groups include the carboxyl, sulfo, and phosphoric acid groups. Of these groups, the carboxyl group in particular is preferred to the others.

Preferably, the dispersant resin(s) has an acid value. Preferably, the acid value is 5 mg KOH/g or more, more preferably from 10 to 200 mg KOH/g, even more preferably from 15 to 150 mg KOH/g. It is still more preferred that the acid value be from 20 to 100 mg KOH/g, more preferably from 25 to 70 mg KOH/g. These are advantageous because in these cases it is easier to ensure that the thickening factor, described later, of the white ink composition is 5 or greater.

The acid value can be measured by neutralization potentiometric titration according to JIS K0070. The titrator can be, for example, Kyoto Electronics Manufacturing's "AT610."

1.1.2. Extra Ingredients

Besides the white colorant, the white ink composition may contain ingredients such as water, resin particles, organic solvents, surfactants, wax, excipients, resin dispersants, preservatives/antimolds, antirusts, chelating agents, viscosity modifiers, antioxidants, and fungicides. Such extra ingredients will now be described.

Water

The white ink composition used in the recording method according to this embodiment may contain water. Preferably, the white ink composition is a water-based white ink composition. A water-based composition contains water as its major solvent component. Such an arrangement enables recording with reduced environmental impact and less emissions, such as odors.

The water may be contained as the primary solvent component of the white ink composition and is an ingredient that evaporates away upon drying. Preferably, the water is of a type from which ionic impurities have been removed to the lowest possible levels, such as deionized water, ultrafiltered water, reverse osmosis water, distilled water, or any other type of purified or ultrapure water. The use of sterilized water, for example sterilized by ultraviolet irradiation or adding hydrogen peroxide, is advantageous because it helps control the development of molds and bacteria when the ink is stored long. Preferably, the water content is 45% by mass or more, more preferably 50% by mass or more and 98% by mass or less, even more preferably 55% by mass or more and 95% by mass or less of the total amount of the white ink composition.

Resin Particles

The white ink composition may contain resin particles. That is, the white ink composition may be a water-based resin white ink. Resin particles help further improve the adhesion, for example, of the image formed by the white ink composition attached to the recording medium. Examples of resin particles include particles of resins such as urethane resins, acrylic resins (including styrene-acrylic resins), fluorene resins, polyolefin resins, rosin-modified resins, terpene resins, polyester resins, polyamide resins, epoxy resins, vinyl chloride resins, vinyl chloride-vinyl acetate copolymers, and ethylene vinyl acetate resins. Of these, urethane resins, acrylic resins, polyolefin resins, and polyester resins are particularly preferred. Particles of these resins are often handled in emulsion form, but resin particles in powder form may also be used. One type of resin particle alone or two or more in combination can be used.

Urethane resin is a generic term for resins having a urethane linkage. A urethane resin may be a polyether urethane resin, which contains, besides the urethane linkage, an ether linkage in its backbone, a polyester urethane resin, which contains an ester linkage in its backbone, or a polycarbonate urethane resin, which contains a carbonate linkage in its backbone. Commercially available urethane resins may also be used. For example, commercially available urethane resins such as SUPERFLEX 460, 460s, 840, and E-4000 (trade names, DKS Co., Ltd.), RESAMINE D-1060, D-2020, D-4080, D-4200, D-6300, and D-6455 (trade names, Dainichiseika Color & Chemicals Mfg. Co., Ltd.), Takelac WS-6021 and W-512-A-6 (trade names, Mitsui Chemicals Polyurethanes, Inc.), Sancure 2710 (trade name, LUBRIZOL), and PERMARIN UA-150 (trade name, Sanyo Chemical Industries) may be used.

Acrylic resin is a generic term for polymers obtained by polymerizing at least an acrylic monomer, such as (meth) acrylic acid or a (meth)acrylate, as a comonomer. Examples include resins made from acrylic monomers and copolymers of acrylic and other monomers. Examples of the latter include acryl-vinyl resins, which are copolymers of acrylic and vinyl monomers. An example of a vinyl monomer is styrene.

Acrylic monomers that can be used also include acrylamide, acrylonitrile, etc. Commercially available resin emulsions made with an acrylic resin may also be used. For example, one or more selected from products such as FK-854 (trade name, Chuo Rika Kogyo), Mowinyl 952B and 718A (trade names, the Nippon Synthetic Chemical Industry), and Nipol LX852 and LX874 (trade names, Zeon) may be used.

It should be noted that acrylic resins herein include styrene-acrylic resins, which are described below. As used herein, the expression (meth)acrylic refers to at least one of acrylic or methacrylic.

Styrene-acrylic resins are copolymers of the styrene monomer and an acrylic monomer. Examples include styrene-acrylic acid copolymers, styrene-methacrylic acid copolymers, styrene-methacrylic acid-acrylate copolymers, styrene-α-methylstyrene-acrylic acid copolymers, and styrene-α-methylstyrene-acrylic acid-acrylate copolymers. Commercially available styrene-acrylic resins may also be used. For example, resins such as Joncryl 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (trade names, BASF), Mowinyl 966A and 975N (trade names, the Nippon Synthetic Chemical Industry), and VINYBLAN 2586 (Nissin Chemical Industry) may be used.

Polyolefin resins are resins having an olefin, such as ethylene, propylene, or butylene, in their structural backbone, and suitable polyolefin resin(s) selected from known ones can be used. Commercially available olefin resins can be used. For example, resins such as ARROWBASE CB-1200 and CD-1200 (trade names, UNITIKA Ltd.) may be used.

Resin particles may be supplied in emulsion form. Examples of commercially available variations of such resin emulsions from which the resin particles may be selected include MICROGEL E-1002 and E-5002 (trade names of Nippon Paint products, styrene-acrylic resin emulsions), VONCOAT 4001 (trade name of a DIC product, an acrylic resin emulsion), VONCOAT 5454 (trade name of a DIC product, a styrene-acrylic resin emulsion), POLYSOL AM-710, AM-920, AM-2300, AP-4735, AT-860, and PSASE-4210E (acrylic resin emulsions), POLYSOL AP-7020 (styrene-acrylic resin emulsion), POLYSOL SH-502 (vinyl acetate resin emulsion), POLYSOL AD-13, AD-2, AD-10, AD-96, AD-17, and AD-70 (ethylene-vinyl acetate resin emulsions), POLYSOL PSASE-6010 (ethylene-vinyl acetate resin emulsion) (trade names of Showa Denko products), POLYSOL SAE1014 (trade name, a styrene-acrylic resin emulsion, Zeon), SAIVINOL SK-200 (trade name, an acrylic resin emulsion, Saiden Chemical Industry), AE-120A (trade name of a JSR product, an acrylic resin emulsion), AE373D (trade name of an Emulsion Technology product, a carboxy-modified styrene-acrylic resin emulsion), SEIKADYNE 1900W (trade name of a Dainichiseika Color & Chemicals Mfg. product, an ethylene-vinyl acetate resin emulsion), VINYBLAN 2682 (acrylic resin emulsion), VINYBLAN 2886 (vinyl acetate-acrylic resin emulsion), VINYBLAN 5202 (acetic acid-acrylic resin emulsion) (trade names of Nissin Chemical Industry products), elitel KA-5071S, KT-8803, KT-9204, KT-8701, KT-8904, and KT-0507 (trade names of Unitika products, polyester resin emulsions), Hytec SN-2002 (trade name of a Toho Chemical product, a polyester resin emulsion), Takelac W-6020, W-635, W-6061, W-605, W-635, and W-6021 (trade names of Mitsui Chemicals Polyurethanes products, urethane resin emulsions), SUPERFLEX 870, 800, 150, 420, 460, 470, 610, and 700 (trade names of DKS products, urethane resin emulsions), PERMARIN UA-150 (Sanyo Chemical Industries, a urethane resin emulsion), Sancure 2710 (Lubrizol Japan, a urethane resin emulsion), NeoRez R-9660, R-9637, and R-940 (Kusumoto Chemicals Ltd., urethane resin emulsions), ADEKA BONTIGHTER HUX-380 and 290K (ADEKA Corporation, urethane resin emulsions), Mowinyl 966A and Mowinyl 7320 (The Nippon Synthetic Chemical Industry Co., Ltd.), Joncryl 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (BASF), NK Binder R-5HN (Shin-Nakamura Chemical Co., Ltd.), HYDRAN WLS-210 (non-crosslinked polyurethane, DIC Corporation), and Joncryl 7610 (BASF).

Preferably, the glass transition temperature (Tg) of the resin particles is −50° C. or above and 200° C. or below, more preferably 0° C. or above and 150° C. or below, even more preferably 50° C. or above and 100° C. or below. It is particularly preferred that the Tg be 50° C. or above and 80° C. or below. A glass transition temperature (Tg) of the resin particles in these ranges tends to make the white ink composition better in durability and anti-clogging properties. The measurement of the glass transition temperature is done according to JIS K7121 (Testing Methods for Transition Temperatures of Plastics), for example using Hitachi High-Tech Science Corporation's "DSC7000" differential scanning colorimeter.

Preferably, the volume-average particle diameter for the resin particles is 10 nm or more and 300 nm or less, more preferably 30 nm or more and 300 nm or less, even more preferably 30 nm or more and 250 nm or less, in particular 40 nm or more and 220 nm or less. The volume-average particle diameter can be measured by the method described above.

Preferably, the resin in the resin particles has an acid value of 50 mg KOH/g or less, more preferably 30 mg KOH/g or less, even more preferably 20 mg KOH/g or less, in particular 10 mg KOH/g or less. As for the lower limit, the acid value is 0 mg KOH/g or more, preferably 5 mg KOH/g or more, more preferably 10 mg KOH/g or more. These are advantageous because in these cases the white ink composition is superior in, for example, the quality of images it forms. The acid value can be measured by the method described above.

The percentage of the resin particles, when contained, in the white ink composition is 0.1% by mass or more and 20% by mass or less, preferably 1% by mass or more and 15% by mass or less, more preferably 2% by mass or more and 10% by mass or less of the total mass of the white ink composition.

Organic Solvent(s)

The white ink composition used in the recording method according to this embodiment may contain an organic solvent. Preferably, the organic solvent dissolves in water. A function of the organic solvent is to improve the wettability of the white ink composition on the recording medium, and another is to enhance the moisture retention of the white ink composition. The organic solvent is also able to function as a penetrant.

Examples of organic solvents include esters, alkylene glycol ethers, cyclic esters, nitrogen-containing solvents, and polyhydric alcohols. Examples of nitrogen-containing solvents include cyclic amides and acyclic amides. Examples of acyclic amides include alkoxyalkylamides.

Examples of esters include glycol monoacetates, such as ethylene glycol monomethyl ether acetate, ethylene glycol monoethyl ether acetate, and ethylene glycol monobutyl ether acetate, and glycol diesters, such as ethylene glycol diacetate, diethylene glycol diacetate, and propylene glycol diacetate.

The alkylene glycol ethers include any monoether or diether of an alkylene glycol, and alkyl ethers are preferred. Specific examples include alkylene glycol monoalkyl ethers, such as ethylene glycol monomethyl ether, ethylene glycol monoethyl ether, ethylene glycol monoisopropyl ether, ethylene glycol monobutyl ether, and diethylene glycol monomethyl ether, and alkylene glycol dialkyl ethers, such as ethylene glycol dimethyl ether, ethylene glycol diethyl ether, ethylene glycol dibutyl ether, diethylene glycol dimethyl ether, and diethylene glycol diethyl ether.

Examples of cyclic esters include cyclic esters (lactones) such as β-propiolactone, γ-butyrolactone, δ-valerolactone, ε-caprolactone, and β-butyrolactone and compounds derived from them by replacing hydrogen(s) in the methylene group adjacent to the carbonyl group with a C1 to C4 alkyl group.

Examples of alkoxyalkylamides include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, and 3-n-butoxy-N,N-methylethylpropionamide.

Examples of cyclic amides include lactams, such as pyrrolidones including 2-pyrrolidone, 1-methyl-2-pyrrolidone, 1-ethyl-2-pyrrolidone, 1-propyl-2-pyrrolidone, and 1-butyl-2-pyrrolidone. These are advantageous in that they accelerate the dissolution of the flocculant(s) and the formation of a coating, described later, by resin particles. In particular, 2-pyrrolidone is preferred to the others.

The compounds represented by general formula (1) below are also alkoxyalkylamides preferred for use.

$$R^1—O—CH_2CH_2—(C=O)—NR^2R^3 \quad (1)$$

In formula (1) above, $R^1$ denotes a C1 to C4 alkyl group, and $R^2$ and $R^3$ each independently denote a methyl or ethyl group. The "C1 to C4 alkyl group" can be a linear-chain or branched alkyl group. To name a few, it can be a methyl, ethyl, n-propyl, isopropyl, n-butyl, sec-butyl, isobutyl, or tert-butyl group. One compound represented by formula (1) above may be used alone, or two or more may be used as a mixture.

An example of a function of nitrogen-containing solvents is to encourage surface drying and the fixation of the white ink composition attached to a low-absorbency recording medium. The compounds represented by formula (1) above are particularly superior in their effect of softening and dissolving vinyl chloride resins to an appropriate extent. The compounds represented by formula (1) above, therefore, allow the white ink composition to penetrate into a low-absorbency recording medium by softening and dissolving a recording surface of the recording medium containing a vinyl chloride resin. Once the white ink composition penetrates into a low-absorbency recording medium in such a way, the white ink composition is firmly fixed, and the surface of the white ink composition is fast-drying. The resulting image, therefore, tends to be superior in surface drying and fixation.

The nitrogen-containing solvent content is not critical, but approximately it is 5% by mass or more and 50% by mass or less, preferably 10% by mass or more and 30% by mass or less, of the total mass of the white ink composition. A nitrogen-containing solvent content in these ranges can help further improve the fixation and surface drying of the image (in particular, surface drying when the image is recorded in a hot and humid environment).

Examples of polyhydric alcohols include 1,2-alkanediols (e.g., alkanediols such as ethylene glycol, propylene glycol (also known as propane-1,2-diol), 1,2-butanediol, 1,2-pentanediol, 1,2-hexanediol, 1,2-heptanediol, and 1,2-octanediol) and polyhydric alcohols other than 1,2-alkanediols (polyols) (e.g., diethylene glycol, dipropylene glycol, 1,3-propanediol, 1,3-butanediol (also known as 1,3-butylene glycol), 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylolpropane, and glycerol).

Examples of polyhydric alcohols include alkanediols and polyols. The alkanediols are diols of C5 or larger alkanes. Preferably, the number of carbon atoms in the alkane is from 5 to 15, more preferably from 6 to 10, even more preferably from 6 to 8. 1,2-Alkanediols are preferred.

The polyols are polyols of C4 or smaller alkanes or products of intermolecular condensation between hydroxyl groups of a polyol of a C4 or smaller alkane. Preferably, the number of carbon atoms in the alkane is 2 or 3. The number of hydroxyl groups in the molecule of a polyol is 2 or more, preferably 5 or less, more preferably 3 or less. When a polyol is a product of intermolecular condensation as described above, the number of molecules condensed is 2 or more, preferably 4 or less, more preferably 3 or less. One polyhydric alcohol alone or a mixture of two or more can be used.

Alkanediols and polyols are able to function primarily as penetration solvents and/or moisturizing solvents. Alkanediols, however, tend to behave more like penetration solvents, and polyols tend to behave more like moisturizing solvents.

The organic solvent(s), when contained in the white ink composition, may be one single organic solvent or may be a combination of two or more. The total percentage of organic solvents to the total mass of the white ink composition is 5% by mass or more and 50% by mass or less for example, preferably 10% by mass or more and 45% by mass or less, more preferably 15% by mass or more and 40% by mass or less, even more preferably 20% by mass or more and 40% by mass or less. An organic solvent content in these ranges encourages the formation of a higher-quality image by making the balance between wettability/spreadability and the ease of drying even better.

More preferably, the white ink composition contains, of the organic solvents listed above by way of example, organic solvent(s) having a normal boiling point of 150.0° C. or above and 280.0° C. or below. Such an arrangement enables recording with faster drying and fixation of the formed image.

More preferably, the white ink composition does not contain more than 1.0% by mass organic solvents that are polyols having a normal boiling point higher than 280.0° C. Preferably, the percentage, in the white ink composition, of organic solvents that are polyols having a normal boiling point exceeding 280° C. is 5% by mass or less, more preferably 3% by mass or less, even more preferably 1% by mass or less, in particular 0.5% by mass or less, in particular 0.1% by mass or less of the total mass of the white ink composition. As for the lower limit, the percentage of organic solvents that are polyols having a normal boiling point exceeding 280° C. may be 0% by mass.

Such an arrangement enables faster recording by allowing the formed image to dry well and also helps improve the adhesion of the image to the recording medium. It is also preferred that the percentage of organic solvents (whether polyols or not) having a normal boiling point higher than 280.0° C. in the white ink composition be in the above ranges. Examples of organic solvents having a normal boiling point exceeding 280° C. include glycerol and polyethylene glycol monomethyl ether.

Surfactant(s)

The white ink composition may contain a surfactant. Surfactants have a function of modifying the surface tension of the white ink composition to adjust the wettability, for example, of the composition on the recording medium. Of surfactants, acetylene glycol surfactants, silicone surfactants, and fluorosurfactants, for example, are particularly preferred for use.

For acetylene glycol surfactants, any of them can be used, but examples include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all are trade names; Air Products and Chemicals), OLFINE B, Y, P, A, STG, SPC, E1004, E1010, PD-001, PD-002W, PD-003, PD-004, EXP.4001, EXP.4036, EXP.4051, AF-103, AF-104, AK-02, SK-14, and AE-3 (all are trade names; Nissin Chemical Industry), and ACETYLENOL E00, E00P, E40, and E100 (all are trade names; Kawaken Fine Chemicals).

For silicone surfactants, any of them can be used, but a preferred example is a polysiloxane compound. The polysiloxane compound can be of any type, but an example is a polyether-modified organosiloxane. Examples of commercially available polyether-modified organosiloxanes include BYK-306, BYK-307, BYK-333, BYK-341, BYK-345, BYK-346, and BYK-348 (trade names, BYK Japan), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names, Shin-Etsu Chemical), and SILFACE SAG002, 005, 503A, and 008 (trade names, Nissin Chemical Industry Co., Ltd.).

As for fluorosurfactants, it is preferred to use a fluorine-modified polymer. Specific examples include BYK-3440 (BYK Japan), SURFLON S-241, S-242, and S-243 (trade names, AGC Seimi Chemical), and FTERGENT 215M (NEOS).

The surfactant(s), when contained in the white ink composition, may be multiple surfactants. The percentage of surfactants when contained in the white ink composition can be 0.1% by mass or more and 2% by mass or less, preferably 0.4% by mass or more and 1.5% by mass or less, more preferably 0.5% by mass or more and 1.0% by mass or less of the total mass of the white ink composition.

Wax

The white ink composition may contain wax. Wax helps reduce the abrasion, for example, of the image formed by the white ink composition with its function of imparting lubricity to the image formed by the white ink composition.

The constituent(s) of the wax can be, for example, one or a mixture of multiple ones of substances including vegetable/animal waxes, such as carnauba wax, candelilla wax, beeswax, rice bran wax, and lanolin; petroleum waxes, such as paraffin waxes, microcrystalline waxes, polyethylene waxes, oxidized polyethylene waxes, and petrolatum; mineral waxes, such as montan wax and ozokerite; and synthetic waxes, such as carbon waxes, hoechst waxes, polyolefin waxes, and stearic acid amide, natural/synthetic wax emulsions, such as α-olefin-maleic anhydride copolymers, and compound waxes. Of these, it is particularly preferred to use a polyolefin wax (polyethylene wax or polypropylene wax in particular) and paraffin wax because they are more effective than the others in improving fixation on a flexible packaging film, which will be described later.

It is also possible to use commercially available wax(es) directly. Examples include NOPCOTE PEM-17 (trade name, San Nopco Ltd.), CHEMIPEARL W4005 (trade name, Mitsui Chemicals, Inc.), and AQUACER 515, 539, and 593 (trade names, BYK Japan KK).

Preferably, the melting point of the wax is 50° C. or above and 200° C. or below so that the loss of the performance of the wax caused by excessive melting of the wax, which can occur when the recording method includes a heating or similar step, will be limited. It is more preferred to use a wax having a melting point of 70° C. or above and 180° C. or below, even more preferably a wax having a melting point of 90° C. or above and 150° C. or below.

Wax may be supplied in emulsion or suspension form. The wax content is, on a solids basis, 0.1% by mass or more and 10% by mass or less, more preferably 0.5% by mass or more and 5% by mass or less, even more preferably 0.5% by mass or more and 2% by mass or less of the total mass of the white ink composition. When the wax content is in these ranges, the wax is able to perform its function, described above, well. It should be noted that the presence of wax in at least one of the white ink composition or the non-white ink composition, described later, is enough for the function of imparting lubricity to the image to be fulfilled.

Excipients

The white ink composition may contain, for example, ureas, amines, or saccharides as excipients. Examples of ureas include urea, ethylene urea, tetramethylurea, thiourea, 1,3-dimethyl-2-imidazolidinone, etc., and betaines (e.g., trimethylglycine, triethylglycine, tripropylglycine, triisopropylglycine, N,N,N-trimethylalanine, N,N,N-triethylalanine, N,N,N-triisopropylalanine, N,N,N-trimethylmethylalanine, carnitine, and acetylcarnitine).

Examples of amines include diethanolamine, triethanolamine, and triisopropanolamine. Ureas and amines may be used to function as pH-adjusting agents.

Examples of saccharides include glucose, mannose, fructose, ribose, xylose, arabinose, galactose, aldonic acid, glucitol (sorbitol), maltose, cellobiose, lactose, sucrose, trehalose, and maltotriose.

Others

Optionally, the white ink composition used in the recording method according to this embodiment may further contain ingredients such as preservatives/antimolds, antirusts, chelating agents, viscosity modifiers, antioxidants, and fungicides.

1.1.3. Characteristics of the White Ink Composition

When the white ink composition is attached to the recording medium by ink jet technology, it is preferred that the viscosity of the white ink composition be 1.5 mPa·s or more and 15 mPa·s or less, more preferably 1.5 mPa·s or more and 7 mPa·s or less, more preferably 1.5 mPa·s or more and 5.5 mPa·s or less at 20° C. When the white ink composition is attached to the recording medium by ink jet technology, this makes it easy to form a predetermined image on the recording medium efficiently.

Preferably, the white ink composition has a surface tension at 25° C. of 40 mN/m or less, preferably 38 mN/m or less, more preferably 35 mN/m or less, even more preferably 30 mN/m or less so that its wettability/spreadability on the recording medium will be appropriate. Preferably, the surface tension is 20 mN/m or more, more preferably 25 mN/m or more.

As for measurement, the surface tension of the white ink composition can be measured by checking it on a platinum plate wet with the composition in a 25° C. environment using CBVP-Z automated surface tensiometer (Kyowa Interface Science).

1.1.4. Thickening Factor of the White Ink Composition

The white ink composition experiences a five-fold or greater increase in viscosity when mixed with a 7% by mass aqueous solution of calcium formate in a ratio by mass of 10:1, the white ink composition to the aqueous solution of calcium formate. Such a thickening ability ensures sufficient aggregation of the relevant ingredient(s) in the white ink composition upon contact with the treatment liquid and makes the image formed by the non-white ink composition and that formed by the non-white ink composition used together superior in quality. In particular, the thinning of fine lines in the recording of characters or similar information is reduced.

With regard to the increase in the viscosity of ink when mixed with a 7% by mass aqueous solution of calcium formate (test solution), the "thickening factor" is now defined as follows. That is, an ink used in the recording method and a 7% by mass aqueous solution of calcium formate are mixed in a ratio by mass of 10:1, the ink to the 7% by mass aqueous solution of calcium formate, and the mixture is stirred. The ratio of the viscosity of the stirred mixture to that of the ink alone (the factor by which the viscosity increases) is the thickening factor. The viscosities are measured at 20° C. The thickening factor, therefore, is the factor by which the mixing increases the viscosity, with the viscosity before the mixing as the baseline. The thickening factor is, for example, approximately 0.5 or greater and 10.0 or less. The thickening factor can be less than 1.0, or the viscosity can decrease, due to the chemical makeup of the ink, but even in that case the name of the parameter is the thickening factor. The viscosities can be measured using a rheometer.

The thickening factor of the white ink composition is 5 or greater for the lower limit. More preferably, the thickening factor is greater than 5, more preferably 5.5 or greater, even more preferably 6 or greater, in particular 7 or greater. It is still more preferred that the thickening factor of the white ink composition be 10 or greater.

There is no upper limit, but preferably, the thickening factor of the white ink composition is 20 or less. More preferably, the thickening factor of the white ink composition is 10 or less, even more preferably 9 or less, still more preferably 8.5 or less, yet more preferably 8 or less. A thickening factor of the white ink composition in these ranges is advantageous because in that case image quality, resistance to cracking, abrasion resistance, and ejection stability, for example, are better. When the thickening factor is in these ranges, furthermore, the quality of the image formed by the non-white ink composition used together is also good; in particular, the thinning of fine lines in the recording of characters or similar information is reduced. An increased attachment density of the ink is also allowed because image quality is good even when the attachment density of the ink is high; the resulting white image, therefore, is superior in background masking.

The primary way to adjust the thickening factor of the white ink composition is to customize the type, percentage, etc., of white pigment(s) (including resin dispersant(s)) and resin particles. It is particularly preferred to adjust it by customizing the type, percentage, etc., of white pigment(s) (including resin dispersant(s)) because it is an easy way of adjustment.

1.1.5. How to Attach the White Ink Composition to the Recording Medium

The white ink attachment step can be carried out in any way as long as it includes attaching the white ink composition while passing an ink jet head over the recording medium. For example, the white ink attachment step can be, preferably is, done by using an ink jet head as the ink jet head and ejecting the white ink composition out of the ink jet head. Such a way of attachment enables efficient high-mix low-volume printing with a compact device.

Preferably, the attachment density of the white ink composition in the white ink attachment step is 5.0 mg/inch$^2$ or more. It is more preferred that the attachment density be 7.0 mg/inch$^2$ or more, preferably 9.0 mg/inch$^2$ or more, more preferably 10.0 mg/inch$^2$ or more, even more preferably 12.0 mg/inch$^2$ or more, even more preferably 15.0 mg/inch$^2$ or more. Such an arrangement helps make the white image even better in completeness and background masking.

As for the upper limit, it is preferred that the attachment density of the white ink composition be 25.0 mg/inch$^2$ or less, more preferably 20.0 mg/inch$^2$ or less, even more preferably 15.0 mg/inch$^2$ or less.

This attachment density of the white ink composition is that in the recording area to which the white and non-white ink compositions are attached to overlap each other in the recording method according to this embodiment. Alternatively, the maximum attachment density of the white ink composition in this area may be, preferably is, in the above ranges.

1.2. Non-White Ink Attachment Step

The non-white ink attachment step is a step in which a non-white ink composition is attached to the recording medium. How to attach the ink composition to the recording medium and other details will be described later.

The non-white ink composition will now be described.

1.2.1. Non-White Colorant(s)

The non-white ink composition is an ink containing at least one non-white colorant, or a "color ink." The term non-white colorant in the context of the non-white ink composition refers to a colorant that is not a white colorant as described above. Examples of non-white colorants include dyes and pigments. Preferably, the non-white colorant is a colorant in the color of, for example, cyan, yellow, magenta, or black.

The non-white colorant may be a dye or pigment and may be a mixture. Of dyes and pigments, however, it is preferred that the non-white colorant include a pigment. Pigments are superior in storage stability characteristics, such as light fastness, weatherability, and resistance to gases, and organic pigments are preferred for storage stability reasons.

Specific examples of pigments that can be used include zo pigments, such as insoluble azo pigments, condensed azo pigments, azo lakes, and chelate azo pigments, polycyclic pigments, such as phthalocyanine pigments, perylene and perinone pigments, anthraquinone pigments, quinacridone pigments, dioxane pigments, thioindigo pigments, isoindolinone pigments, and quinophthalone pigments, dye chelates, dye lakes, nitro pigments, nitroso pigments, aniline black, daylight fluorescent pigments, and carbon black. One such pigment can be used alone, or two or more can be used in combination. Glitter pigments may also be used as non-white colorants.

Any type of pigment can be used, but specific examples include the following.

Examples of black pigments include pigments like No. 2300, No. 900, MCF88, No. 33, No. 40, No. 45, No. 52, MA7, MA8, MA100, and No. 2200B (Mitsubishi Chemical Corporation), pigments like Raven 5750, Raven 5250, Raven 5000, Raven 3500, Raven 1255, and Raven 700 (Carbon Columbia), pigments like Regal 400R, Regal 330R, Regal 660R, Mogul L, Monarch 700, Monarch 800, Monarch 880, Monarch 900, Monarch 1000, Monarch 1100, Monarch 1300, and Monarch 1400 (CABOT JAPAN K.K.), and Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, and Special Black 4 (Degussa).

Examples of yellow pigments include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of magenta pigments include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245 and C.I. Pigment Violet 19, 23, 32, 33, 36, 38, 43, and 50.

Examples of cyan pigments include C.I. Pigment Blue 1, 2, 3, 15, 15:1, 15:2, 15:3, 15:34, 15:4, 16, 18, 22, 25, 60, 65, and 66 and C.I. Vat Blue 4 and 60.

As for pigments other than magenta, cyan, and yellow, any such pigment can be used, but examples include C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63.

For pearl pigments, any such pigment can be used, but examples include pearlized or interference pigments, such as titanium dioxide-coated mica, pearl essence, and bismuth oxychloride.

For metallic pigments, any such pigment can be used, but examples include particles of metals such as aluminum, silver, gold, platinum, nickel, chromium, tin, zinc, indium, titanium, and copper or alloys thereof.

As for dyes, types of dyes commonly used in ink jet recording can be used, including direct dyes, acid dyes, food dyes, basic dyes, reactive dyes, disperse dyes, vat dyes, soluble vat dyes, and reactive disperse dyes.

Preferably, the non-white colorant is stably dispersible or soluble in a dispersion medium. A dispersant, therefore, may be used to disperse the non-white colorant. Examples of dispersants that can be used are the same as listed above for the white ink composition, in which dispersant(s) may be used to improve the dispersibility of the white colorant.

The non-white colorant may be dispersed using a dispersant. Preferably, the dispersant is a dispersant resin. The acid value of the dispersant resin for the non-white colorant may be equal to or near that of the dispersant resin(s) for the white colorant, described above, and it is particularly preferred that the acid value of the dispersant resin be 30 mg KOH/g or more. Preferably, the acid value of the dispersant resin for the non-white colorant is higher than that of the dispersant resin(s) for the white colorant, more preferably higher by 5 mg KOH/g or more, even more preferably higher by 10 to 30 mg KOH/g. These are advantageous because in these cases image quality, for example, is better.

Preferably, the non-white colorant content is 0.3% by mass or more and 20% by mass or less, more preferably by mass or more and 15% by mass or less of the total mass of the non-white ink composition. Even more preferably, the non-white colorant content is 1% by mass or more and 10% by mass or less, more preferably 2% by mass or more and 7% by mass or less.

When the non-white colorant is pigment(s), it is preferred that the volume-average particle diameter for the pigment particles be 10 nm or more and 300 nm or less, more preferably 30 nm or more and 250 nm or less, even more preferably 50 nm or more and 250 nm or less, in particular nm or more and 200 nm or less. Still more preferably, the volume-average particle diameter for the pigment particles is 80 nm or more and 150 nm or less. The volume-average particle diameter of the non-white colorant is that measured in the initial-state of the colorant in the method for checking the volume-average particle diameter described above. A volume-average particle diameter in these ranges is advantageous because in that case desired colorants are readily available, and the characteristics, for example, of the colorant(s) tend to be good.

1.2.2. Extra Ingredients

Besides the non-white colorant, the non-white ink composition may contain ingredients such as water, resin particles, organic solvents, surfactants, wax, excipients, resin dispersants, preservatives/antimolds, antirusts, chelating agents, viscosity modifiers, antioxidants, and fungicides.

Excluding the colorant, the ingredients in the non-white ink composition are similar to those in the white ink composition and can be selected independently of those in the white ink composition. These ingredients are not described in detail; for all of them, the same applies as described above for the white ink composition, and examples of substances that can be used are the same as listed above for the white ink composition (read "white ink composition" as "non-white ink composition" in the above description).

As in the case of the white ink composition, it is preferred that the non-white ink composition be a water-based ink, more preferably a water-based resin ink. Such an arrangement enables recording with reduced environmental impact and less emissions, such as odors.

As in the case of the white ink composition, furthermore, it is preferred that the non-white ink composition contain organic solvent(s) having a normal boiling point of 150.0° C. or above and 280.0° C. or below. This enables recording with faster fixation of the image.

Moreover, as in the case of the white ink composition, it is preferred that the non-white ink composition do not contain more than 1.0% by mass organic solvents having a normal boiling point higher than 280.0° C. This enables recording with faster drying of the image and, furthermore, is expected to improve the adhesion of the image.

1.2.3. Thickening Factor of the Non-White Ink Composition

More preferably, the non-white ink composition experiences a five-fold or greater increase in viscosity when mixed with a 7% by mass aqueous solution of calcium formate in a ratio by mass of 10:1, the non-white ink composition to the aqueous solution of calcium formate. Such a thickening ability ensures sufficient aggregation of the relevant ingredient(s) in the non-white ink composition upon contact with the treatment liquid and makes the image formed by the non-white ink composition superior in quality. In particular, the thinning of fine lines in the recording of characters or similar information is reduced. The definition of the thickening factor is the same as that for the white ink composition, described above.

Preferably, the thickening factor of the non-white ink composition is 5 or greater, more preferably greater than 5, even more preferably 5.5 or greater, still more preferably 6 or greater, in particular 7 or greater. It is yet more preferred that the thickening factor of the non-white ink composition be 10 or greater.

There is no upper limit, but preferably, the thickening factor of the non-white ink composition is 20 or less. More preferably, the thickening factor of the non-white ink composition is 10 or less, even more preferably 9 or less, still more preferably 8.5 or less, yet more preferably 8 or less. A thickening factor of the non-white ink composition in these ranges is advantageous because in that case image quality, resistance to cracking, abrasion resistance, and ejection stability, for example, are better.

The primary way to adjust the thickening factor of the non-white ink composition is to customize the type, percentage, etc., of pigment(s) (including resin dispersant(s)) and resin particles. The characteristics, such as viscosity and surface tension, of the non-white ink composition are not described; the same applies as described above for the white ink composition.

1.2.4. How to Attach the Non-White Ink Composition to the Recording Medium

The non-white ink attachment step can be carried out in any way as long as it includes attaching the non-white ink composition while passing an ink jet head over the recording medium. More preferably, however, the non-white ink attachment step is done by using an ink jet head as the ink jet head and ejecting the non-white ink composition out of the ink jet head. Such a way of attachment enables efficient high-mix low-volume printing with a compact device.

Preferably, the attachment density of the non-white ink composition in the non-white ink attachment step is 3.0 mg/inch$^2$ or more, more preferably 5.0 mg/inch$^2$ or more, even more preferably 6.0 mg/inch$^2$ or more. Such an arrangement helps make the resulting non-white image better in color strength. As for the upper limit, it is preferred that the attachment density of the non-white ink composition be 15.0 mg/inch$^2$ or less, more preferably 10.0 mg/inch$^2$ or less, even more preferably 7.0 mg/inch$^2$ or less.

This attachment density of the non-white ink composition is that in the recording area to which the white and non-white ink compositions are attached to overlap each other in the recording method according to this embodiment. Alternatively, the maximum attachment density of the non-white ink composition in this area may be, preferably is, in the above ranges.

More preferably, the maximum attachment density of the white ink composition in the white ink attachment step, described above, is higher than that of the non-white ink composition in the non-white ink attachment step. Such an arrangement enables recording with even better background masking.

1.3. First Treatment Liquid Attachment Step

The first treatment liquid attachment step is a step accompanying the white ink attachment step and in which a treatment liquid containing at least one flocculant is attached to the recording medium. The treatment liquid will now be described. How to attach it to the recording medium will be described later.

1.3.1. Treatment Liquid

The treatment liquid contains at least one flocculant.

1.3.1.1. Flocculant(s)

The treatment liquid contains at least one flocculant that causes the relevant ingredient(s) in the inks (white and non-white ink compositions) to aggregate. The flocculant reacts with the pigment(s) in the inks and other possible ingredient(s) in the inks, such as resin particles, to cause the pigment(s) and resin particles to aggregate. The degree of aggregation of the pigment(s) and resin particles caused by the flocculant varies according to the flocculant, pigment(s), and resin particles used and therefore is controllable. The flocculant, furthermore, is able to react with the pigment(s) and resin particles contained in the inks and thereby cause the pigment(s) and resin particles to aggregate. Such a way of aggregation helps, for example, improve the color strength of the pigment(s), enhance the fixation of the resin particles, and/or increase the viscosity of the ink.

The flocculant can be of any type, but examples include metal salts, inorganic acids, organic acids, and cationic compounds. Cationic compounds that can be used include cationic resins (cationic polymers) and cationic surfactants. Of these, polyvalent metal salts are particularly preferred in the category of metal salts, and cationic resins are particularly preferred in the category of cationic compounds. It is, therefore, preferred that the flocculant be selected from cationic resins, organic acids, and polyvalent metal salts because in that case the achieved image quality, abrasion resistance, luster, etc., are superb.

Preferred metal salts are polyvalent metal salts, but metal salts other than polyvalent metal salts can also be used. Of such flocculants, it is particularly preferred to use at least one selected from metal salts and organic acids because these substances are superior in reactivity with the relevant ingredient(s) in the inks. In the category of cationic compounds, furthermore, it is particularly preferred to use cationic resin(s) because cationic resins are highly soluble in the treatment liquid. A combination of multiple flocculants can also be used.

Polyvalent metals are compounds composed of at least one divalent or higher-valency metal ion and an anion. Examples of divalent or higher-valency metal ions include the ions of metals such as calcium, magnesium, copper, nickel, zinc, barium, aluminum, titanium, strontium, chromium, cobalt, and iron. Of such metal ions that can be a component of a polyvalent metal salt, it is particularly preferred that the metal ion be at least one of the calcium or magnesium ion because these ions are superior in the ability to cause the relevant ingredient(s) in the inks to aggregate.

The anion as a component of a polyvalent metal salt is an inorganic or organic ion. That is, a polyvalent metal salt as mentioned herein is a salt formed by an inorganic or organic ion and polyvalent metal(s). Examples of inorganic ions in such a context include the chloride, iodide, nitrate, sulfate, and hydroxide ions. Examples of organic ions include organic acid ions, such as the carboxylate ion.

Preferably, the polyvalent metal compound is an ionic polyvalent metal salt. In particular, the use of a magnesium or calcium salt as the polyvalent metal salt makes the treatment liquid more stable. The counterion for the polyvalent metal may be either an inorganic acid or organic acid ion.

Specific examples of polyvalent metal salts include calcium carbonates, such as heavy calcium carbonate and light calcium carbonate, calcium nitrate, calcium chloride, calcium sulfate, magnesium sulfate, calcium hydroxide, magnesium chloride, magnesium carbonate, barium sulfate, barium chloride, zinc carbonate, zinc sulfide, aluminum silicate, calcium silicate, magnesium silicate, copper nitrate, calcium formate, calcium acetate, magnesium acetate, and aluminum acetate. One such polyvalent metal salt may be used alone, or two or more may be used in combination. Of these, it is particularly preferred that the polyvalent metal salt(s) be at least one of calcium formate, magnesium sulfate, calcium nitrate, or calcium chloride, more preferably calcium formate and/or calcium nitrate, because this helps ensure sufficient dissolution in water and makes the treatment liquid less likely to leave spots (the spots left behind are less conspicuous). In addition, such metal salts may have water of hydration in their raw material form.

Examples of metal salts other than polyvalent metal salts include salts of monovalent metals, such as sodium salts and potassium salts. Examples include sodium sulfate and potassium sulfate.

Examples of suitable organic acids include poly(meth) acrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyronecarboxylic acid, pyrrolecarboxylic acid, furancarboxylic acid, pyridinecarboxylic acid, coumarinic acid, thiophenecarboxylic acid, nicotinic acid, derivatives of these compounds, and salts of these acids and derivatives. One organic acid may be used alone, or two or more may be used in combination. Salts of organic acids that are polyvalent metal salts are treated as being polyvalent metal salts as described above.

Examples of inorganic acids include sulfuric acid, hydrochloric acid, nitric acid, and phosphoric acid. One inorganic acid may be used alone, or two or more may be used in combination.

Examples of cationic resins (cationic polymers) include cationic urethane resins, cationic olefin resins, cationic amine resins, and cationic surfactants. Water-soluble cationic polymers are preferred.

For cationic urethane resins, commercially available ones can be used. Examples of commercially available resins that can be used include HYDRAN CP-7010, CP-7020, CP-7030, CP-7040, CP-7050, CP-7060, and CP-7610 (trade names, Dainippon Ink and Chemicals, Inc.), SUPERFLEX 600, 610, 620, 630, 640, and 650 (trade names, DKS Co. Ltd.), and WBR-2120C and WBR-2122C urethane emulsions (trade names, Taisei Fine Chemical Co., Ltd.).

Cationic olefin resins are cationic resins having an olefin, such as ethylene or propylene, in their structural backbone, and suitable cationic olefin resin(s) selected from known ones can be used. The cationic olefin resin(s) may be in the state of emulsion, dispersed in water or solvents including, for example, organic solvents. Commercially available cationic olefin resins can be used, examples of which include ARROWBASE CB-1200 and CD-1200 (trade names, Unitika Ltd.).

As for cationic amine resins (cationic amine polymers), any cationic resin having an amino group in its structure would work, and suitable cationic amine resin(s) selected from known ones can be used. Examples include polyamine resins, polyamide resins, and polyallylamine resins. Polyamine resins are resins having an amino group in their polymer backbone. Polyamide resins are resins having an amide group in their polymer backbone. Polyallylamine resins are resins having a structure derived from an allyl group in their polymer backbone.

Examples of cationic polyamine resins include Senka Corporation's UNISENCE KHE103L (hexamethylenediamine/epichlorohydrin resin; pH of a 1% aqueous solution, approximately 5.0; viscosity, 20 to 50 (mPa·s); a 50% by mass solids aqueous solution) and UNISENCE KHE104L (dimethylamine/epichlorohydrin resin; pH of a 1% aqueous solution, approximately 7.0; viscosity, 1 to 10 (mPa·s); a 20% by mass solids aqueous solution). Further specific examples of commercially available cationic polyamine resins include FL-14 (SNF), ARAFIX 100, 251S, 255, and 255LOX (Arakawa Chemical), DK-6810, 6853, and 6885 and WS-4010, 4011, 4020, 4024, 4027, and 4030 (Seiko PMC), PAPYOGEN P-105 (Senka), Sumirez Resin 650(30), 675A, 6615, and SLX-1 (Taoka Chemical), Catiomaster® PD-1, 7, 30, A, PDT-2, PE-10, PE-30, DT-EH, EPA-SK01, and TMHMDA-E (Yokkaichi Chemical), and JETFIX 36N, 38A, and 5052 (Satoda Chemical Industrial).

Polyamine resins also include polyallylamine resins. Examples of polyallylamine resins include polyallylamine hydrochloride, polyallylamine amidosulfate, allylamine hydrochloride-diallylamine hydrochloride copolymers, allylamine acetate-diallylamine acetate copolymers, allylamine acetate-diallylamine acetate copolymers, allylamine hydrochloride-dimethylallylamine hydrochloride copolymers, allylamine-dimethylallylamine copolymers, polydiallylamine hydrochloride, polymethyldiallylamine hydrochloride, polymethyldiallylamine amidosulfate, polymethyldiallylamine acetate, polydiallyldimethylammonium chloride, diallylamine acetate-sulfur dioxide copolymers, diallylmethylethylammonium ethyl sulfate-sulfur dioxide copolymers, methyldiallylamine hydrochloride-sulfur dioxide copolymers, diallyldimethylammonium chloride-sulfur dioxide copolymers, and diallyldimethylammonium chloride-acrylamide copolymers.

As for cationic surfactants, examples include primary-, secondary-, or tertiary-amine salt compounds, alkylamine salts, dialkylamine salts, aliphatic amine salts, benzalkonium salts, quaternary ammonium salts, quaternary alkylammonium salts, alkylpyridinium salts, sulfonium salts, phosphonium salts, onium salts, and imidazolinium salts.

Multiple ones of such flocculants may be used. Selecting at least one from polyvalent metal salts, organic acids, and cationic resins, furthermore, helps form a higher-quality image (good in color strength in particular) because flocculants in these categories are better than others in their flocculating effects.

The total percentage of flocculants in the treatment liquid is 0.1% by mass or more and 20% by mass or less for example, preferably 1% by mass or more and 20% by mass or less, more preferably 2% by mass or more and 15% by mass or less of the total mass of the treatment liquid. For flocculants supplied in solution or dispersion form, too, it is preferred that the flocculant content on a solids basis be in these ranges. A flocculant content of 1% by mass or more would be enough for the flocculant to be able to cause the relevant ingredient(s) in the inks to aggregate. A flocculant content of 30% by mass or less leads to better dissolution or dispersion of the flocculant in the treatment liquid, thereby helping improve the storage stability, for example, of the treatment liquid.

Preferably, the flocculant is one(s) having a solubility of 1 g or more, more preferably 3 g or more and g or less, in 100 g of water at 25° C. because this ensures good dissolution of the flocculant in the treatment liquid even when the treatment liquid contains a highly hydrophobic organic solvent.

1.3.1.2. Extra Ingredients

Besides the flocculant, the treatment liquid may contain ingredients such as resin particles, water-soluble organic solvents, surfactants, water, wax, excipients, resin dispersants, preservatives/antimolds, antirusts, chelating agents, viscosity modifiers, antioxidants, and fungicides unless its functions are impaired. These ingredients are not described in detail; the same applies as described above for the white ink composition.

1.3.2. Characteristics of the Treatment Liquid

Preferably, the treatment liquid used in the recording method according to this embodiment has a surface tension at 25° C. of 40 mN/m or less, preferably 38 mN/m or less, more preferably 35 mN/m or less, even more preferably 30 mN/m or less so that its wettability/spreadability on the recording medium will be appropriate. As for measurement, the surface tension of the treatment liquid can be measured by checking it on a platinum plate wet with the composition in a 25° C. environment using CBVP-Z automated surface tensiometer (Kyowa Interface Science).

More preferably, the treatment liquid is attached to the recording medium by ink jet technology. In that case, it is preferred that the viscosity of the treatment liquid at 20° C. be 1.5 mPa·s or more and 15 mPa·s or less, more preferably 1.5 mPa·s or more and 7 mPa·s or less, even more preferably 1.5 mPa·s or more and 5.5 mPa·s or less. When the treatment liquid is attached to the recording medium by ink jet technology, this makes it easy to form predetermined treatment liquid-coated area(s) efficiently.

1.3.3. How to Attach the Treatment Liquid to the Recording Medium

The attachment of the treatment liquid to the recording medium can be done by one or a combination of non-contact or contact techniques, such as ink jet technology, coating with a roller, bar, or other tools, applying the treatment liquid to the recording medium using sprays, immersing the recording medium in the treatment liquid, and applying the treatment liquid to the recording medium using a brush or similar tools. Of these, ink jet technology is particularly preferred.

A mechanism used to attach a treatment liquid or ink to a recording medium is referred to as an attachment mechanism. Attachment mechanisms are mechanisms with which the above attachment techniques are implemented, and examples include a roller, an ink jet head, a spray, and a brush.

The first treatment liquid attachment step accompanies the white ink attachment step. In this context, "accompany" means the attachment of the treatment liquid to the recording medium in the first treatment liquid attachment step is before or simultaneous with the point in time at which the white ink composition is attached to the recording medium in the white ink attachment step. That is, the attachment of the treatment liquid to the recording medium in the first treatment liquid attachment step is done after the treatment liquid is attached to the recording medium or at the same time as the treatment liquid adheres to the recording medium. An exemplary way of attachment in which the treatment liquid is attached to the recording medium in the first treatment liquid attachment step simultaneously with the adhesion of the treatment liquid to the recording medium is one in which the white ink composition is attached to the recording medium in a certain scan (pass), and the treatment liquid is also attached to the same scan area in the same scan. This concept also includes a way of attachment in which the treatment liquid and the white ink composition are attached to the recording medium in "one pass" with the recording apparatus described later.

For example, when the treatment liquid attachment steps are done by ink jet technology, the first treatment liquid attachment step may be performed in the same scan as the white ink attachment step, and the second treatment liquid attachment step may be performed in the same scan as the non-white ink attachment step.

The term "accompany" also means the steps are done in such a manner that the white ink composition that adheres to the recording medium as a result of the white ink attachment step and the treatment liquid that adheres to the recording medium as a result of the first treatment liquid attachment step come into contact and react together on the recording medium.

1.4. Second Treatment Liquid Attachment Step

The second treatment liquid attachment step is a step accompanying the non-white ink attachment step and in which a treatment liquid containing at least one flocculant is attached to the recording medium. The treatment liquid is not described; the same applies as described above for the treatment liquid used in the first treatment liquid attachment step. The treatment liquid used in the second treatment liquid attachment step may be the same as or may be different from that used in the first treatment liquid attachment step.

The attachment mechanism used in the second treatment liquid attachment step may be the same mechanism as or may be a mechanism different from that used in the first treatment liquid attachment step. That is, one and the same attachment mechanism may be used to perform the first and second treatment liquid attachment steps.

For the characteristics and attachment to the recording medium of the treatment liquid used in the second treatment liquid attachment step, too, the same applies as described above for the treatment liquid used in the first treatment liquid attachment step. It should be noted that the second treatment liquid attachment step accompanies the non-white ink attachment step. The meaning of "accompany" is the same as described above for the first treatment liquid attachment step. The second treatment liquid attachment step is performed later than the white ink attachment step.

The surface tension of the treatment liquids used in the treatment liquid attachment steps, furthermore, may be lower than that of the non-white ink composition, and the surface tension of the non-white ink composition may be lower than that of the white ink composition. Such an arrangement improves image completeness, or reduces pinholes, because in that case the treatment liquids wet and spread on the substrate better, and the white ink on them also spreads better. It becomes, furthermore, easier to form the non-white image on the white image by virtue of higher wettability/spreadability of the non-white ink composition than that of the white ink composition.

1.5. Attachment Density in Each Step

In the recording method according to this embodiment, the first and second treatment liquid attachment steps are performed in such a manner that the attachment density of the treatment liquid in the second is lower than that in the first. Too high an attachment density of the treatment liquid in the second treatment liquid attachment step can cause lines in the image to be thin as a result of overaggregation of the relevant ingredient(s) in the non-white ink composition. At the second treatment liquid attachment step, furthermore, there still remains at least part of the treatment liquid used for the attachment of the white ink composition. Making the attachment density of the treatment liquid in the second treatment liquid attachment step low, therefore, helps limit the thinning of lines in the image by preventing overaggregation of the relevant ingredient(s) in the non-white ink composition and also helps control the defect of image unevenness caused by ink bleed (bleed-related unevenness).

It should be noted that the attachment density of the treatment liquid in the first treatment liquid attachment step and that in the second treatment liquid attachment step are those in the common recording area to the first and second treatment liquid attachment steps.

Preferably, the attachment density of the treatment liquid in the first treatment liquid attachment step is 0.1 mg/inch$^2$ or more and 4.0 mg/inch$^2$ or less. It is more preferred that the attachment density of the treatment liquid in the first treatment liquid attachment step be 0.5 mg/inch$^2$ or more and 3.0 mg/inch$^2$ or less, even more preferably 0.4 mg/inch$^2$ or more and 2.5 mg/inch$^2$ or less, still more preferably 0.5 mg/inch$^2$ or more and 2.0 mg/inch$^2$ or less, yet more preferably 0.8 mg/inch$^2$ or more and 1.5 mg/inch$^2$ or less. The maximum attachment density of the treatment liquid in the first treatment liquid attachment step may be in these ranges instead. Such an arrangement helps further limit bleed-related unevenness and the thinning of fine lines in the image formed by the non-white ink composition while maintaining the quality of the image formed by the white ink composition sufficiently high.

As for the attachment density of the treatment liquid in the second treatment liquid attachment step, it is preferred that it be 2.5 mg/inch$^2$ or less, more preferably 0.05 mg/inch$^2$ or more and 2.3 mg/inch$^2$ or less, even more preferably 0.1 mg/inch$^2$ or more and 2.2 mg/inch$^2$ or less. Still more preferably, the attachment density of the treatment liquid in the second treatment liquid attachment step is 0.2 mg/inch$^2$ or more and 2.0 mg/inch$^2$ or less, yet more preferably 0.4 mg/inch$^2$ or more and 1.5 mg/inch$^2$ or less, further preferably 0.5 mg/inch$^2$ or more and 1.0 mg/inch$^2$ or less. The maximum attachment density of the treatment liquid in the second treatment liquid attachment step may be in these ranges instead. Such an arrangement helps further limit bleed-related unevenness and the thinning of fine lines in the image formed by the non-white ink composition.

Preferably, the total attachment density of the treatment liquid attached in the first treatment liquid attachment step and that attached in the second treatment liquid attachment step is 4.0 mg/inch$^2$ or less, more preferably 0.1 mg/inch$^2$ or more and 3.8 mg/inch$^2$ or less. It is even more preferred that the total attachment density of the treatment liquids be 0.5 mg/inch$^2$ or more and 3.5 mg/inch$^2$ or less, still more preferably 0.8 mg/inch$^2$ or more and 2.5 mg/inch$^2$ or less, yet more preferably 1.0 mg/inch$^2$ or more and 2.0 mg/inch$^2$ or less. Such an arrangement helps further reduce incompleteness of the image formed by the white ink composition and also helps make the quality of the image formed by the non-white ink composition even better.

In addition, in the area to which the white and non-white colorants have been attached, the attachment density of the treatment liquids on the recording medium may be constant or may vary from place to place. In particular, the attachment density of the treatment liquids may vary from place to place according to the attachment density of the non-white ink composition. In the recording method according to this embodiment, however, the first and second treatment liquid attachment steps are performed in such a manner that the attachment density of the treatment liquid in the second is lower than that in the first anywhere recording is performed (in any given recording area).

For example, the treatment liquid attachment steps are performed in such a manner that the attachment density of the treatment liquid in the second treatment liquid attachment step is lower than that in the first even in the recording area of the highest attachment density of the treatment liquid in the second treatment liquid attachment step. Even when there is a recording area in which the attachment density of the treatment liquid in the second treatment liquid attachment step reaches its maximum and in which that in the first reaches its minimum, furthermore, the treatment liquid attachment steps are performed in such a manner that the attachment density of the treatment liquid in the second treatment liquid attachment step in this recording area is lower than that in the first in the same recording area.

The ratio (ratio by mass) of the attachment density of the treatment liquid in the second treatment liquid attachment step to that in the first treatment liquid attachment step is less than 1. Preferably, this ratio is 0.1 or greater and 0.9 or less, more preferably 0.2 or greater and 0.5 or less, even more preferably 0.3 or greater and 0.49 or less, in particular 0.4 or greater and 0.47 or less. These are advantageous because in these cases image quality, for example, is better.

1.6. Mass of Droplets in Each Step

When the first and second treatment liquid attachment steps are performed by ink jet technology, it is preferred that the mass of the multiple droplets of the treatment liquids in the first and second treatment liquid attachment steps be 10 ng or less. More preferably, the mass of the droplets is 7 ng or less. Such an arrangement helps increase the chance of contact between the treatment liquids and the inks on the recording medium.

When such a reason is considered, it is more preferred that the mass of the multiple droplets of the treatment liquids in the first and second treatment liquid attachment steps be 5 ng or less, even more preferably 4 ng or less, still more preferably 3 ng or less. Preferably, the mass of the droplets is 1 ng or more.

In this context, the mass of the droplets is that of one droplet ejected from the ink jet head. It is also referred to as the dot mass of the droplets.

When the white ink attachment and non-white ink attachment steps are performed in one scan together with the first and second treatment liquid attachment steps, respectively, the white and non-white ink compositions and the treatment liquids can strike the same place in the same area at different times in one scan, but the time lags in that case are very small. The order in which the white and non-white ink compositions and the treatment liquids strike the same place in the same area in one scan, however, is not critical.

When the recording method according to this embodiment is implemented, a recording job may be carried out by repeating the movement of an ink jet head (main scan) and a sub-scan, which is to change the relative positions of the ink jet head and the recording medium across the direction of the movement as in the case of the ink jet recording apparatus described later. The recording job may be done by repeating main and sub-scans alternately. Alternately, in a sub-scan after a main scan, the relative positions of the ink jet head and the recoding medium may be moved in the sub-scan direction over a distance shorter than the length of the nozzle array of the ink jet head, and in the next main scan, the area scanned in the previous main scan may be scanned. In that case, an area to which an ink or treatment liquid is attached by the nozzle array of the ink jet head in one scan is subjected to further attachment of the ink or treatment liquid in another. In other words, the recording method may be configured so that an area of the recording medium faced by the nozzle array of the ink jet head in one scan may be faced by the nozzle array of the ink jet head in another once again.

The sub-scans may be performed by moving the recording medium in relation to the ink jet head or may be performed by moving the ink jet head in relation to the recording medium.

As can be seen from these, there may be a scan area of the recording medium to which, in a recording job, an ink or treatment liquid adheres while the ink jet head moves once and to which the ink or treatment liquid is further attached while the ink jet head moves again. That is, there may be an area scanned twice or more. The number of times one single area is scanned is referred to as the number of scans (scan value or pass value). The number of scans is per ink.

The number of scans is one or more, preferably two or more, more preferably four or more. There is no limit, but preferably the number of scans is 20 or fewer, more preferably 15 or fewer, even more preferably 10 or fewer. Still more preferably, the number of scans is four or fewer, yet more preferably two or fewer.

A scan value equal to or greater than these ranges is advantageous because in that case unevenness in density and variations in image quality are reduced better. A scan value equal to or smaller than these ranges is advantageous because in that case the print speed is better.

The number of scans depends partly on the structure of the recording apparatus, but for example, it is calculated as follows. The length of the ink jet head in the sub-scan direction divided by the distance the recording medium moves in the sub-scan direction in one sub-scan is the number of scans.

When scans are made in such a way, the recording method according to this embodiment allows the white ink composition to strike a certain recording area of the recording medium earlier than the non-white ink composition in one main scan, with the proviso that ejection is controlled via appropriate positioning of the ink jet head's nozzles for the ejection of the white ink composition, nozzles for the ejection of the non-white ink composition, and nozzles for the ejection of the treatment liquids.

1.7. Extra Steps

The recording method according to this embodiment includes steps in which treatment liquids, a white ink composition, and a non-white ink composition are each attached to a recording medium. Optionally, the recording method may further include step(s) in which one or more of the treatment liquids, white ink composition, and non-white ink composition are further attached to the recording medium. The order and the number of such steps, furthermore, are not critical; as many steps as needed can be performed in an appropriate order. Preferably, the treatment liquids and inks are attached to the same area of the recording medium.

The recording method according to this embodiment may include, for example, a drying step in which liquid(s) that has adhered to the recording medium is dried (primary heating step) and/or a step in which the recording medium is heated (postheating step).

1.7.1. Drying Step

The recording method according to this embodiment may include a drying step (primary heating step). The recording method according to this embodiment may include a step of drying the recording medium before or during an attachment step for a treatment liquid or ink. As well as stopping recording and leaving the recording medium, a drying step can be performed by drying the recording medium using a drying mechanism. Examples of drying using a drying mechanism include blowing air at room temperature or warm air onto the recording medium (air-blow drying), irradiating the recording medium with a type of radiation that produces heat (e.g., infrared radiation) (radiation drying), using an element that transfers heat to the recording medium by touching it (conduction drying), and combinations of two or more of these. When the recording method includes a drying step, it is preferred that the drying step be performed by air-blow drying in particular, which is preferred to the others.

A drying step (primary drying step) in which a drying mechanism that heats the recording medium is used as a drying mechanism is in particular referred to as a heating step (primary heating step). For example, a drying step in which air at room temperature, of the drying mechanisms mentioned above, is blown is not a heating step.

Preferably, the surface temperature of the recording medium at the time of attachment of a treatment liquid or ink composition is 45° C. or below, more preferably 20° C. or above and 45° C. or below. Preferably, this surface temperature is 27.0° C. or above and 40° C. or below, more preferably 28° C. or above and 30° C. or below. This temperature is the surface temperature of the portion of the recording surface of the recording medium to which the liquid is attached in the attachment step, and is the highest temperature the recording area reaches during the attachment step. A surface temperature in these ranges is better in terms of image quality, abrasion resistance, and the reduction of clogging.

A drying step can be performed simultaneously with one or two or more of the treatment liquid attachment and ink attachment steps described above. When a drying step is performed simultaneously with an ink attachment step, it is preferred that the surface temperature of the recording medium be 30° C. or below, more preferably 28° C. or below.

When a drying step for drying the recording medium is performed before or during a treatment liquid attachment step, it is preferred that the surface temperature of the recording medium at the time of adhesion of the treatment liquid to the recording medium be 30.0° C. or above, preferably 35.0° C. or above, more preferably 40.0° C. or above. Such an arrangement can help further increase the adhesion and abrasion resistance of the resulting image because in that case the formation of a coating by the treatment liquid is encouraged, for example when the treatment liquid contains resin particles.

Each attachment step, furthermore, may be performed without a primary heating step. Such an arrangement helps make the ejection stability of the inks, for example, even better. Each attachment step may even be carried out without a primary drying step.

1.7.2. Postheating Step

The recording method according to this embodiment may include a postheating step for further heating the recording medium after each attachment step described above. A postheating step can be performed using, for example, a suitable heater. A postheating step is carried out with the use of, for example, an afterheater. (In the example of an ink jet recording apparatus described later, the heating heater 5 corresponds to it.) The heater does not need to be a heating component of the ink jet recording apparatus but may be an independent dryer. This helps dry the resulting image and make its fixation more complete, thereby helping, for example, make the recorded article ready for use quickly.

The temperature of the recording medium in that case is not critical, but it can be selected considering, for example, the Tg of the resin component forming resin particles contained in the recorded article. When the Tg of the resin component forming resin particles or wax is considered, it is good to set the temperature of the recording medium higher than the Tg of the resin component forming the resin particles by 5.0° C. or more, preferably 10.0° C. or more.

The surface temperature of the recording medium reached through the heating in the postheating step is 30.0° C. or above and 120.0° C. or below, preferably 40.0° C. or above and 100.0° C. or below, more preferably 50.0° C. or above and 95° C. or below, even more preferably 70° C. or above and 90° C. or below. In particular, it is preferred that the surface temperature of the recording medium reached through the heating in the postheating step be 80° C. or above. When the temperature of the recording medium is approximately in these ranges, resin particles or wax contained in the recorded article forms a flat coating. Such a temperature of the recording medium also helps the resulting image dry, thereby helping make its fixation more complete.

1.8. Operations and Advantages

In the recording method according to this embodiment, a treatment liquid is attached not only in a first treatment liquid attachment step, which accompanies the attachment of a white ink composition, but also in a second treatment liquid attachment step, which accompanies the attachment of a non-white ink composition. This helps improve the quality of the image formed by the white ink composition and also helps limit bleed-related unevenness in the image formed by the non-white ink composition.

The attachment density of the treatment liquid in the second treatment liquid attachment step, furthermore, is lower than that in the first treatment liquid attachment step. The amount of treatment liquid attached in the second treatment liquid attachment step, therefore, cannot be greater than is needed for causing the relevant ingredient(s) in the non-white ink composition to aggregate. This precludes overaggregation of the relevant ingredient(s) in the non-white ink composition, thereby helping limit the thinning of lines in the image formed by the non-white ink composition.

1.9. Recording Medium

The recording medium on which an image is formed in the recording method according to this embodiment may be one having an ink-absorbing recording surface or may be one having no such surface. The recording medium, therefore, can be of any type, and examples include liquid-absorbing recording media, such as paper, films, and fabrics, recording media having low liquid absorbency, such as paper for commercial printing, and recording media having no liquid absorbency, such as metals, glass, and polymers.

A recording medium having low or no liquid absorbency is a recording medium that absorbs little or no ink. Quantitatively, a recording medium having no or low liquid absorbency is a "recording medium that absorbs 10 mL/m$^2$ or less of water from the start of contact to 30 msec$^{1/2}$ in the Bristow test." This Bristow test is the most popular method for brief measurement of liquid absorption and has also been adopted by the Japan Technical Association of the Pulp and Paper Industry (JAPAN TAPPI). The details of the test method are set forth in No. 51 of JAPAN TAPPI Test Method 2000, which specifies the Bristow test as a method for testing the absorption of liquid in paper and paperboard. A liquid-absorbing recording medium, on the other hand, is a recording medium that is neither a recording medium having low liquid absorbency nor a recording medium having no liquid absorbency. Low liquid absorbency and the absence of liquid absorbency may be referred to herein simply as low-absorbency and non-absorbent, respectively.

Examples of recording media having no liquid absorbency include paper or other substrates with a plastic coating thereon, paper or other substrates with a plastic film bonded thereto, and a plastic film without an absorbing (receiving) layer. Examples of plastic materials in this context include polyvinyl chloride, polyethylene terephthalate, polycarbonate, polystyrene, polyurethane, polyethylene, and polypropylene.

Examples of recording media having low liquid absorbency include recording media having a low-absorbency coating layer on their surface. An example is what is called coated paper. Examples of paper-based ones, for instance, include paper for commercial printing, such as art paper, low coat-weight paper, and matte-coated paper, and examples of plastic-based ones include films of polyvinyl chloride, polyethylene terephthalate, polycarbonate, polystyrene, polyurethane, polyethylene, polypropylene, etc., having a coating, for example of a polymer, on their surface and those having a coating of particles, for example of silica or titanium, with a binder therein.

The recording medium can be a liquid-absorbing recording medium. The term liquid-absorbing recording medium refers to a "recording medium that absorbs more than 10 mL/m$^2$ of water from the start of contact to 30 msec$^{1/2}$ in the Bristow test," the Bristow test being as described above.

An example of a liquid-absorbing recording medium is a recording medium that absorbs liquids by virtue of a liquid-absorbing receiving layer provided on its surface. An example is ink jet paper (dedicated paper for ink jet recording). The liquid-absorbing receiving layer can be, for example, a layer of a liquid-absorbing resin, liquid-absorbing fine inorganic particles, or other liquid-absorbing materials.

Recording media whose substrate itself absorbs liquids are also examples of liquid-absorbing recording media. Examples include fibrous webs and paper containing pulp. Examples of paper include ordinary printing paper, cardboard, and liner paper. Examples of liner paper include those made from paper such as kraft pulp or wastepaper.

2. Ink Jet Recording Apparatus

A recording apparatus according to this embodiment is used to implement any of the recording methods described above and includes an attachment mechanism with which the white ink attachment step is performed, an attachment mechanism with which the non-white ink attachment step is performed, an attachment mechanism with which the first treatment liquid attachment step is performed, and an attachment mechanism with which the second treatment liquid attachment step is performed.

An example of an ink jet recording apparatus with which the recording method according to the above embodiment can be implemented will now be described with reference to drawings.

Figure 2:
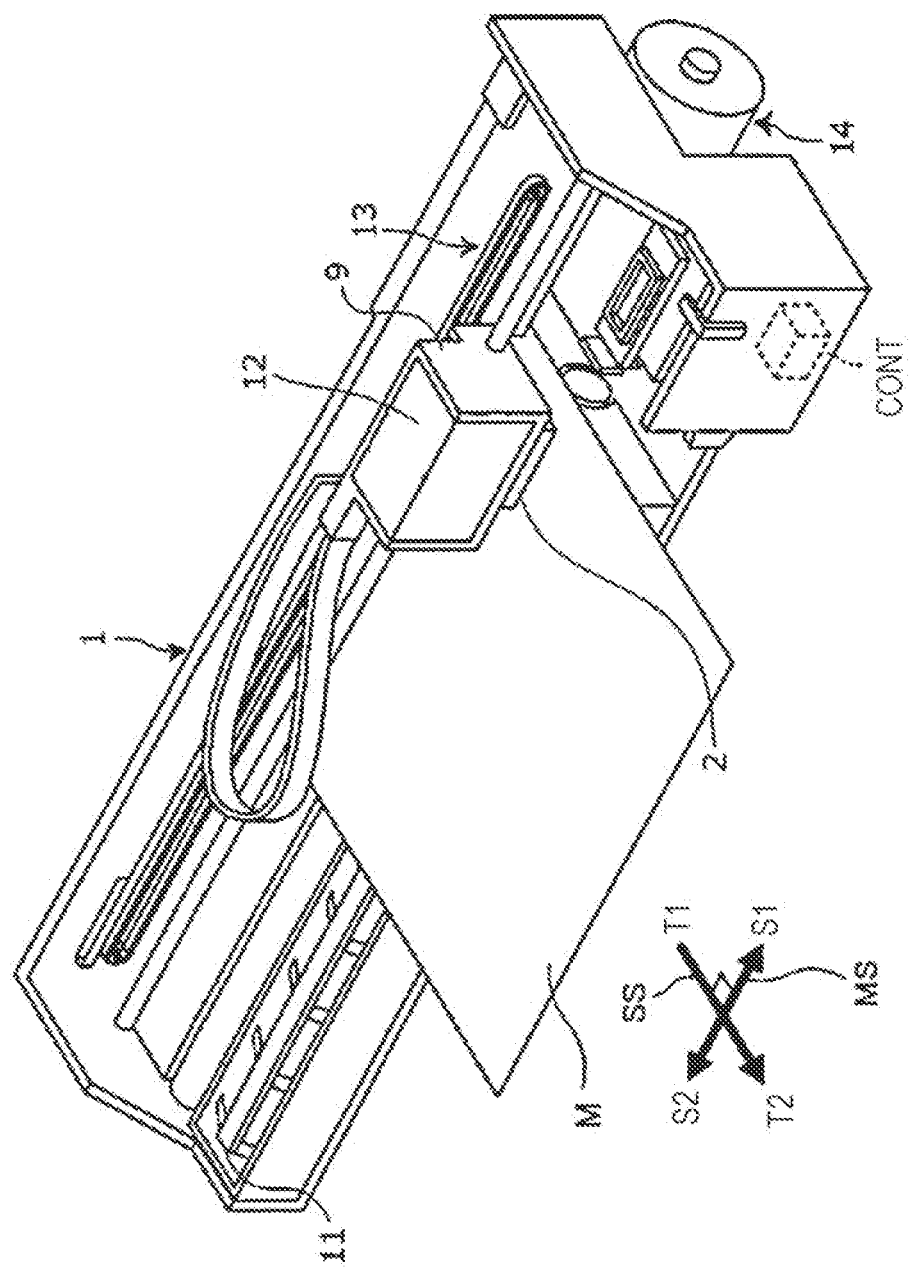
FIG. 2 is a schematic view of the carriage and related components of an example of an ink jet recording apparatus that can be used in a recording method according to an embodiment.

FIG. 1 is a cross-sectional outline diagram schematically illustrating the ink jet recording apparatus, and FIG. 2 is a perspective diagram illustrating an exemplary structure of the carriage and related components of the ink jet recording apparatus 1 illustrated in FIG. 1. As illustrated in FIGS. 1 and 2, the ink jet recording apparatus 1 includes an ink jet head 2, an IR heater 3, a platen heater 4, a heating heater 5, a cooling fan 6, a preheater 7, a fan blower 8, a carriage 9, a platen 11, a carriage-moving mechanism 13, a transporter 14, and a control section CONT. The ink jet recording apparatus 1 is configured so that its overall operation is controlled by the control section CONT illustrated in FIG. 2.

The ink jet recording apparatus illustrated in FIG. 1 is a serial recording apparatus, which performs recording by repeating main and sub-scans. It should be noted that a scan may also be referred to as a main scan. A serial recording apparatus is advantageous in that it can be small in size compared with a line recording apparatus, described later.

The ink jet head 2 is configured to eject inks and treatment liquids through its nozzles onto a recording medium M to record an image thereon. In this embodiment, the ink jet head 2 is a serial ink jet head; it moves relative to the recording medium M in the main scan direction multiple times and attaches inks and treatment liquids to the recording medium M during the movements. The ink jet head 2 is carried by the carriage 9, which is illustrated in FIG. 2. As the carriage-moving mechanism 13 operates to move the carriage 9 in the medium width direction, or along the width of the recording medium M, the ink jet head 2 is moved relative to the recording medium M in the main scan direction. The medium width direction is the main scan direction for the ink jet head 2. A movement in the main scan direction is also referred to as a main scan.

The main scan direction, furthermore, is the direction in which the carriage 9 moves carrying the ink jet head 2. In FIG. 1, the main scan direction is a direction that crosses the sub-scan direction, indicated by arrow SS, which is the direction of transport of the recording medium M. In FIG. 2, the direction along the width of the recording medium M, or the direction indicated by S1-S2, is the main scan direction MS, and the direction indicated by T1-T2 is the sub-scan direction SS. In one scan, the ink jet head 2 moves in the main scan direction, or in either the direction of arrow S1 or that of arrow S2. A main scan, which is a movement of the ink jet head 2, and a sub-scan, which is the transport of the recording medium M, are repeated multiple times to record an image on the recording medium M.

The cartridge assembly 12, which supplies the inks and treatment liquids to the ink jet head 2, includes multiple independent cartridges. The cartridge assembly 12 is detachably attached to the carriage 9 carrying the ink jet head 2. Each of the multiple cartridges has been loaded with ink or a treatment liquid, and the cartridge assembly 12 supplies predetermined inks and treatment liquids to nozzles. The cartridge assembly 12 in this embodiment has been attached to the carriage 9, but this is not the only possible configuration; the cartridge assembly 12 may be provided elsewhere than the carriage 9 and supply the inks and treatment liquids to nozzles via supply tubes (not illustrated). The nozzles for the ejection of inks and those for the ejection of treatment liquids may be designed to be appropriate, as well as the position of the cartridge assembly 12. The cartridge assembly 12, furthermore, may carry multiple ink jet heads 2.

The ejection from the ink jet head 2 can be done by a known mechanism. In this embodiment, vibrations of piezoelectric elements are used to eject droplets; in other words, mechanical deformations of electrostrictive elements are used to form ink droplets and eject them.

When white ink and non-white ink compositions and treatment liquids as described above are ejected from the ink jet head 2, the ink jet head 2 constitutes part of the attachment mechanism with which the white ink attachment step is performed, the attachment mechanism with which the non-white ink attachment step is performed, the attachment mechanism with which the first treatment liquid attachment step is performed, and the attachment mechanism with which the second treatment liquid attachment step is performed.

The ink jet recording apparatus 1 includes an IR heater 3 and a platen heater 4 for heating the recording medium M while inks and treatment liquids are ejected from the ink jet head 2. A drying step for drying the recording medium M, when performed in this embodiment, can be carried out using drying mechanisms such as the IR heater 3, the fan blower 8, the platen heater 4, and the preheater 7. A drying step performed during ink attachment to dry the ink that has adhered to the recording medium is also referred to as a primary drying step.

The IR heater 3 enables radiation heating of the recording medium M by irradiating it with infrared radiation from the ink jet head 2 side. This often causes the ink jet head 2 to be heated together but allows the temperature of the recording medium M to be raised without being influenced by the thickness of the recording medium M compared with when the recording medium M is heated from its backside, for example with the platen heater 4. Alternatively, the recording apparatus 1 may include fans for drying ink or non-white ink on the recording medium M by blowing warm air or air at ambient temperature onto the recording medium M (e.g., the fan blower 8).

The platen heater 4 is able to heat the recording medium M, with the platen 11 therebetween, at a position where it faces the ink jet head 2 so that inks and treatment liquids ejected by the ink jet head 2 will dry soon after being attached to the recording medium M. The platen heater 4 is a heater capable of conduction heating of the recording medium M, and, as stated, its use in the recording method according to this embodiment is optional. When used, the platen heater 4 is controlled preferably to make the surface temperature of the recording medium M 40.0° C. or below.

The ink attachment steps may include no drying step in which ink that has adhered to the recording medium is dried with a drying mechanism, or may include performing a drying step at a relatively low temperature. These are advantageous because in these cases image completeness, for example, are better by virtue of a limited drying rate of the ink that has adhered to the recording medium.

Whether or not the recording medium M is dried with a drying mechanism during the ink attachment steps, it is preferred that the surface temperature of the recording medium M be 45.0° C. or below, more preferably 40.0° C. or below, even more preferably 38.0° C. or below, in particular 35.0° C. or below for the upper limit. Still more preferably, the surface temperature of the recording medium M is 30° C. or below, preferably 28° C. or below, preferably 25° C. or below. As for the lower limit, it is preferred that the surface temperature of the recording medium M be 20° C. or above, preferably 25.0° C. or above, more preferably 28.0° C. or above, even more preferably 30.0° C. or above, in particular 32.0° C. or above. When the recording medium is not dried with such a drying mechanism as described above, too, its surface temperature may be, preferably is, in these ranges.

At temperatures equal to or lower than these ranges, the drying and chemical alteration of the inks and treatment liquids within the ink jet head 2 are limited, helping reduce the deposition of resin particles, for example, on the inner walls of the ink jet head 2. Such temperatures are also advantageous because at such temperatures the resulting image is better in completeness, color strength, variations in quality, etc. At temperatures equal to or higher than these ranges, the inks and treatment liquids are quickly fixed on the recording medium M, helping improve image quality. It should be noted that this temperature is the highest temperature of the portion of the surface of the recording medium facing the ink jet head reaches during the ink or treatment liquid attachment step.

The heating heater 5 is a heater for drying and solidifying ink attached to the recording medium M, i.e., a heater for secondary drying or secondary heating. The heating heater 5 can be used for a postheating step. When the heating heater 5 heats the recording medium M with a recorded image thereon, the water, for example, in the liquid evaporates faster than otherwise, leaving there an ink film formed by resin(s) in the liquid. The ink film becomes firmly fixed on or strongly sticks to the recording medium M, and this good film formation helps obtain a good, high-quality image in a short time. Preferably, the heating heater 5 heats the recording medium M to a surface temperature of 120.0° C. or below, more preferably 100.0° C. or below, even more preferably 90.0° C. or below for the upper limit. As for the lower limit, it is preferred that the recording medium M be heated to a surface temperature of 60.0° C. or above, more preferably 70.0° C. or above, even more preferably 80.0° C. or above. At temperatures in these ranges, a high-quality image is obtained in a short time. It should be noted that this temperature is the highest temperature the portion of the recording medium subjected to the secondary heating reaches in the recording job.

The ink jet recording apparatus 1 may have a cooling fan 6. Drying ink attached to the recording medium M and then cooling the ink on the recording medium M with a cooling fan 6 helps form an ink coating on the recording medium M with good adhesion.

The ink jet recording apparatus 1, furthermore, may be equipped with a preheater 7 for preheating the recording medium M before the inks are attached to the recording medium.

Below the carriage 9 are a platen 11 that supports the recording medium M, a carriage-moving mechanism 13 that moves the carriage 9 relative to the recording medium M, and a transporter 14 that is a roller for transporting the recording medium M in the sub-scan direction. The operation of the carriage-moving mechanism 13 and the transporter 14 is controlled by the control section CONT.

Figure 3:
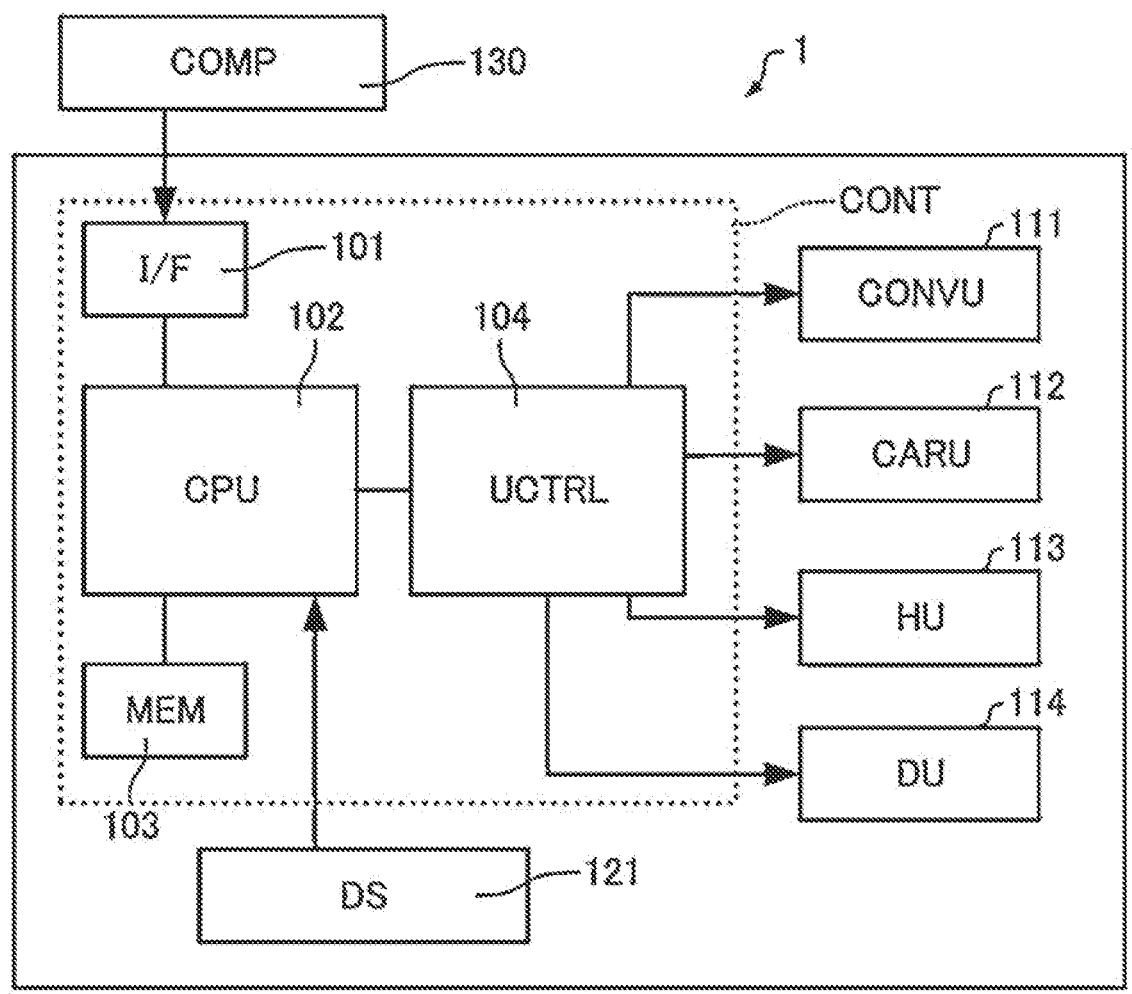
FIG. 3 is a block diagram for an example of an ink jet recording apparatus that is used in a recording method according to an embodiment.

FIG. 3 is a functional block diagram for the ink jet recording apparatus 1. The control section CONT is a control unit for controlling the ink jet recording apparatus 1. The interface 101 (I/F) is for data exchange between a computer 130 (COMP) and the ink jet recording apparatus 1. The CPU 102 is a processing unit for overall control of the ink jet recording apparatus 1. The memory 103 (MEM) is for, for example, storing programs in and providing workspace for the CPU 102. The CPU 102 controls each unit via a unit control circuit 104 (UCTRL). A set of detectors 121 (DS) monitor the internal status of the ink jet recording apparatus 1, and the results provide the basis for the control section CONT to control each unit.

The transport unit 111 (CONVU) is a unit that controls sub-scans (the transporter) in ink jet recording jobs, specifically the direction and speed of transport of the recording medium M. Specifically, it controls the direction and transport of the recording medium M by controlling the direction and speed of rotation of a motor-driven transport roller.

The carriage unit 112 (CARU) is a unit that controls main scans (passes) (the scan mechanism) in ink jet recording jobs. Specifically, it moves the ink jet head 2 back and forth in the main scan direction. The carriage unit 112 includes a carriage 9 carrying the ink jet head 2 and a carriage-moving mechanism 13 for moving the carriage 9 back and forth.

The head unit 113 (HU) is a unit that controls the volume of ink or treatment liquid ejected from the nozzles of the ink jet head 2. For example, when the nozzles of the ink jet head 2 are driven by piezoelectric elements, the head unit 113 controls the operation of the piezoelectric element at each nozzle. By the head unit 113, parameters such as the time at which the liquids are attached and the size and mass of the dots formed by the inks and treatment liquids are controlled. The carriage unit 112 and the head unit 113, furthermore, work together to control the volumes of inks and treatment liquids attached per scan.

The drying unit 114 (DU) controls the temperature of heaters, such as the IR heater 3, the preheater 7, the platen heater 4, and the heating heater 5.

Configured as described above, the ink jet recording apparatus 1 repeats the operation of moving the carriage 9 carrying the ink jet head 2 in the main scan direction (main scan) and a transport operation (sub-scan) alternately. In each pass during this, the control section CONT controls the carriage unit 112 to move the ink jet head 2 in the main scan direction and, at the same time, controls the head unit 113 to make the ink jet head 2 eject droplets of the inks and treatment liquids through predetermined nozzle orifices. As a result, droplets of inks and treatment liquids are attached to the recording medium M. The control section CONT also controls the transport unit 111 to transport the recording medium M in the direction of transport by a predetermined distance (feed) during the transport operation.

For this ink jet recording apparatus 1, the nozzles of the ink jet head 2 are arranged in, for example, rows, and the manufacturer can assign a predetermined ink or treatment liquid to each individual row. The nozzles may be controlled so that some in the same row eject the assigned liquid while the others do not, or so that nozzles in the same row eject the liquid at different times. The carriage 9 may carry multiple ink jet heads 2, and in that case, likewise, the ink jet heads 2 may be controlled so that some of them eject the assigned liquid while the others do not, or so that they eject the assigned liquids at different times.

Figure 4:
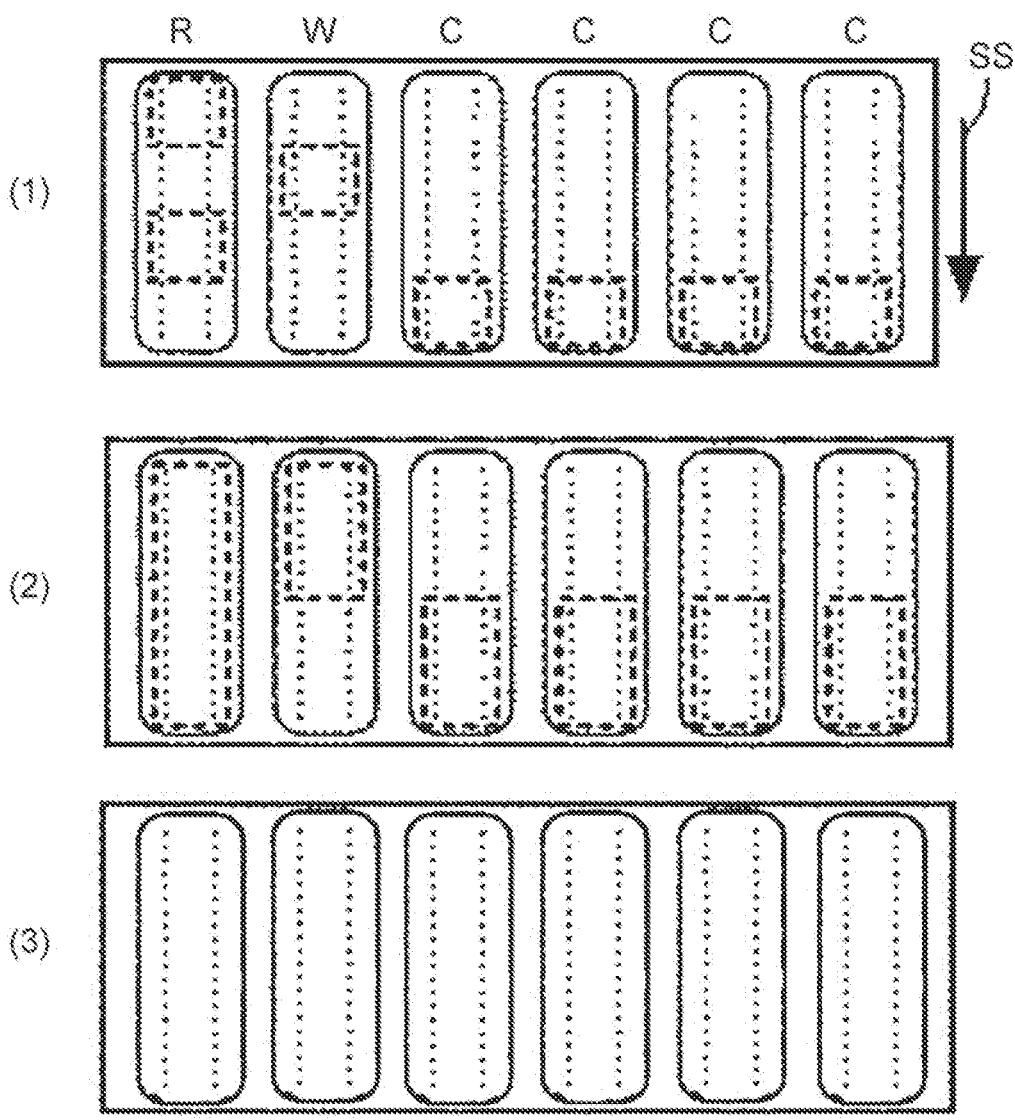
FIGS. 4 (1) to 4 (3) are schematic views of examples of ink jet heads for an ink jet recording apparatus that can be used in a recording method according to an embodiment.

FIGS. 4 (1) to 4 (3) illustrate exemplary structures of an ink jet head of a recording apparatus with which the recording method according to this embodiment is implemented. FIG. 4 (1) is one example, a bottom view of the entire ink jet head illustrated in FIG. 1. The ink jet head (rectangular frame) as a whole is composed of a treatment liquid ink jet head R, a white ink composition ink jet head W, and non-white ink composition ink jet heads C arranged in a row in the main scan direction (horizontal in the drawing). Each ink jet head has rows of nozzles arranged in the sub-scan direction SS. The number of rows of nozzles per ink jet head does not need to be two as in the drawing; there only need to be at least one row of nozzles. For each ink jet head, the nozzles used for recording are indicated by broken lines enclosing them. As the recording job proceeds through a main scan and a sub-scan performed sequentially, the treatment liquid and ink compositions are attached to the same scan area of the recording medium in the following order: the enclosed portion of the treatment liquid ink jet head R upstream in the sub-scan direction, the enclosed portion of the white ink composition ink jet head W, the enclosed portion of the treatment liquid ink jet head R downstream in the sub-scan direction, and then the enclosed portion of the non-white ink composition ink jet heads C. At the enclosed portion of the treatment-liquid ink jet head R upstream in the sub-scan direction, the first treatment liquid attachment step is carried out. At the enclosed portion of the treatment-liquid ink jet head R downstream in the sub-scan direction, the second treatment liquid attachment step is carried out.

FIG. 4 (2) also illustrates an exemplary structure of the ink jet head, a different example from that in FIG. 4 (1). In the same way as in FIG. 4 (1), the white ink attachment step is performed by the portion of the white ink composition ink jet head W enclosed by broken lines. In the same main scan as the white ink attachment step, the first treatment liquid attachment step is performed by the portion of the treatment liquid ink jet head R that overlaps the enclosed portion of the white ink composition ink jet head W in the sub-scan direction when projected in the main scan direction. As the recording job proceeds through a main scan and a sub-scan performed sequentially, the non-white ink attachment step is performed by the enclosed portion of the non-white ink composition ink jet heads C. In the same main scan as the non-white ink attachment step, the second treatment liquid attachment step is performed by the portion of the treatment liquid ink jet head R that overlaps the enclosed portion of the non-white ink composition ink jet heads C in the sub-scan direction when projected in the main scan direction.

FIG. 4 (3) illustrates yet another example of a structure of the ink jet head. The white ink attachment step is performed by the entire white ink composition ink jet head. In the same main scan as the white ink attachment step, the first treatment liquid attachment step is performed by the entire treatment liquid ink jet head R. Then the non-white ink attachment step is performed by the non-white ink composition ink jet heads C in their entirety. In the same main scan as the non-white ink attachment step, the second treatment liquid attachment step is performed by the entire treatment liquid ink jet head R. The white ink attachment and non-white ink attachment steps may be performed without a sub-scan therebetween, or a sub-scan may be interposed between these steps for image alignment. A sub-scan may be performed after the non-white ink attachment step.

In the examples illustrated in FIGS. 4 (1) to (3), the recording job is performed using only particular portion(s) of the ink jet heads. Alternatively, the ink jet heads may be present only in the portions enclosed by the broken lines in FIGS. 4 (1) to (3). In other words, the portion(s) of the ink jet heads used for recording may be regarded as the ink jet heads.

The recording method according to the above embodiment does not need to be one configured to be performed with a serial recording apparatus as in the above examples; it may be a recording method configured to be performed with a line recording apparatus.

Figure 5:
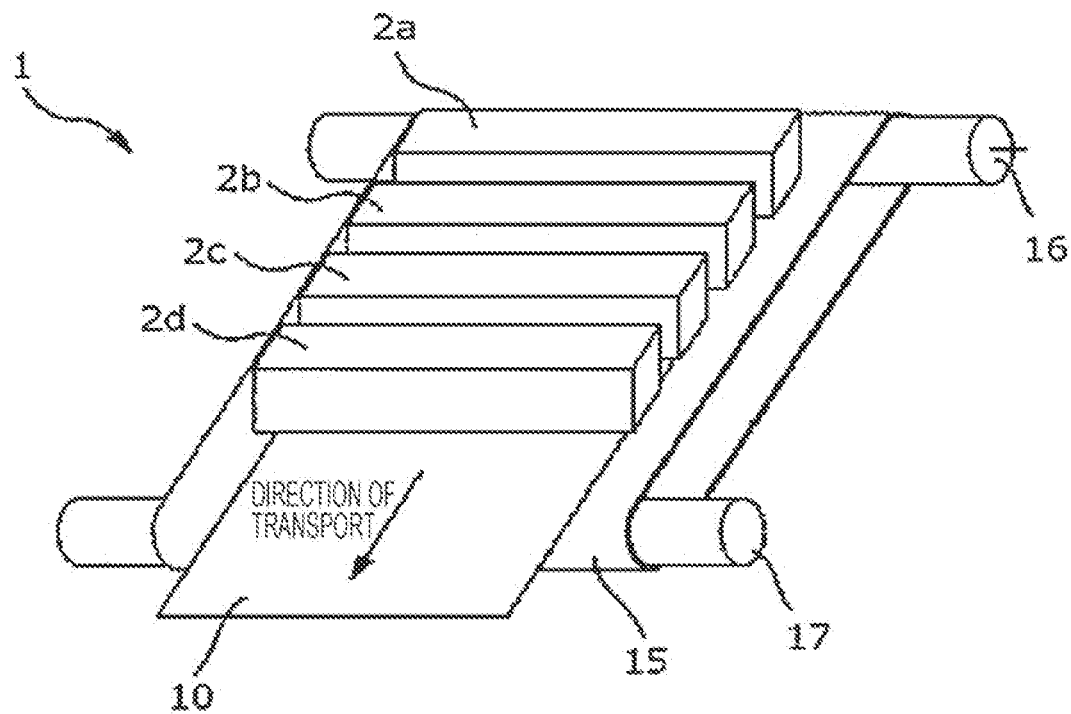
FIG. 5 is a schematic view of another example of an ink jet recording apparatus that can be used in a recording method according to an embodiment.

FIG. 5 is an example of a line recording apparatus. The ink jet recording apparatus 1 illustrated in FIG. 5 transports the recording medium 10 in the direction of transport on its recording medium support 15 and transport rollers 16 and 17. As the recording job proceeds, the recording medium being transported is subjected to the attachment of liquids in the following order: the first treatment liquid attachment step by an ink jet head 2a, the white ink attachment step by an ink jet head 2b, the second treatment liquid attachment step by an ink jet head 2c, and the non-white ink attachment step by an ink jet head 2d. A line recording apparatus is advantageous over a serial recording apparatus, described above, because it helps speed up the recording job.

In implementing the recording method according to the above embodiment, the arrangement, settings, etc., of the ink jet head(s) can be as described by way of example in the Examples section below. An example that can be given here, however, is that the ink jet head(s) can be configured to ensure that the white ink attachment step, in the above recording method, will be performed in such a manner that the area to which the ink can be attached in one scan is finished in one scan, and that the non-white ink attachment step will be performed in such a manner that the area to which the ink can be attached in one scan is finished in one scan. Such an approach helps perform the recording job at a better recording speed.

In the above recording method, furthermore, the ink jet head(s) can be configured to ensure that the first treatment liquid attachment step will be performed in the same scan as the white ink attachment step, and that the second treatment liquid attachment step will be performed in the same scan as the non-white ink attachment step. Such an approach helps perform the recording job at a better recording speed.

The recording apparatus according to this embodiment attaches a treatment liquid not only in a first treatment liquid attachment step, which accompanies the attachment of a white ink composition, but also in a second treatment liquid attachment step, which accompanies the attachment of non-white ink composition(s). This helps improve the quality of the image formed by the white ink composition and also helps limit bleed-related unevenness in the image(s) formed by the non-white ink composition(s).

The attachment density of the treatment liquid in the second treatment liquid attachment step, furthermore, is lower than that in the first treatment liquid attachment step. The amount of treatment liquid attached in the second treatment liquid attachment step, therefore, cannot be greater than is needed for causing the relevant ingredient(s) in the non-white ink composition(s) to aggregate. This precludes overaggregation of ingredient(s) in the non-white ink composition(s), thereby helping limit the thinning of lines in the image(s) formed by the non-white ink composition(s).

3. Examples and Comparative Examples

Aspects of the present disclosure will now be described in further detail by providing examples. No aspect of the present disclosure, however, is limited to these examples. In the following, "parts" and "%" are by mass unless stated otherwise. The evaluations were performed under 25.0° C. and 40.0% RH conditions unless otherwise noted.

3.1. Preparation of Inks and Treatment Liquids

Ingredients were put into a container according to the formula given in Table 1, mixed together and stirred for 2 hours using a magnetic stirrer, and then thoroughly mixed by dispersion with 0.3-mm zirconia beads in a bead mill. After 1 hour of stirring, the mixture was filtered through a 5.0-μm PTFE membrane filter. In this way, white ink compositions (W1 to W4), non-white ink compositions (C1 and C2), and treatment liquids (R1 to R3) were obtained. The amounts of ingredients in Table 1 are in % by mass. The water was purified water and added to make the mass of the ink 100% by mass. The pigments and the dispersant resins were used in the form of liquid dispersions, prepared as described below.

TABLE 1

|  |  | Treatment liquid | | | White ink composition | | | | Non-white ink composition | |
| --- | --- | --- | --- | --- | --- | --- | --- | --- | --- | --- |
|  |  | R1 | R2 | R3 | W1 | W2 | W3 | W4 | C1 | C2 |
| Flocculant | Calcium formate | 7.0 | — | — | — | — | — | — | — | — |
|  | Cationic polymer | — | 4.0 | — | — | — | — | — | — | — |
|  | Malonic acid | — | — | 7.0 | — | — | — | — | — | — |

TABLE 1-continued

|  |  | Treatment liquid | | | White ink composition | | | | Non-white ink composition | |
|---|---|---|---|---|---|---|---|---|---|---|
|  |  | R1 | R2 | R3 | W1 | W2 | W3 | W4 | C1 | C2 |
| White pigment | Titanium dioxide | — | — | — | 10.0 | 10.0 | 10.0 | 10.0 | — | — |
| Dispersant resin | Resin A (anionic) | — | — | — | 3.0 | — | 3.0 | 3.0 | — | — |
|  | Resin B (nonionic) | — | — | — | — | 3.0 | — | — | — | — |
| Non-white pigment | Carbon black | — | — | — | — | — | — | — | 3.0 | 3.0 |
| Dispersant resin | Resin C (anionic) | — | — | — | — | — | — | — | 2.0 | 2.0 |
| Resin particles | Styrene acrylic resin A | — | — | — | 5.0 | 5.0 | — | 5.0 | 5.0 | — |
|  | Styrene acrylic resin B | — | — | — | — | — | 5.0 | — | — | 5.0 |
| Wax | Polyethylene wax | — | — | — | 1.0 | 1.0 | 1.0 | 1.0 | 1.0 | 1.0 |
| Surfactant | Silicone surfactant | 1.0 | 1.0 | 1.0 | 1.0 | 1.0 | 1.0 | 2.0 | 1.0 | 1.0 |
| Organic solvents | 2-Pyrrolidone | 15.0 | 15.0 | 15.0 | 10.0 | 10.0 | 10.0 | 10.0 | 15.0 | 15.0 |
|  | Propylene glycol | 15.0 | 15.0 | 15.0 | 10.0 | 10.0 | 10.0 | 10.0 | 10.0 | 10.0 |
| Water | Purified water | Balance | Balance | Balance | Balance | Balance | Balance | Balance | Balance | Balance |
| Total |  | 100 | 100 | 100 | 100 | 100 | 100 | 100 | 100 | 100 |
| Reactivity with test solution (thickening factor) [folds] |  | — | — | — | 10 | 4 | 7 | 10 | 10 | 4 |
| Surface tension [mN/m] |  | 23.5 | 23.2 | 23.8 | 26.0 | 26.0 | 26.0 | 24.5 | 25.0 | 25.0 |

In Table 1, the ingredients not identified by a compound name were as follows.

Cationic polymer: "Catiomaster PD-7," a polyamine resin (epichlorohydrin-amine derivative resin), Yokkaichi Chemical Co., Ltd.

Dispersant resin A (anionic): An acrylic acid-acrylate copolymer (weight-average molecular weight, 25,000; acid value, 25)

Dispersant resin B (nonionic): An acrylic acid-acrylate copolymer (weight-average molecular weight, 25,000; acid value, 0)

Dispersant resin C (anionic): An acrylic acid-acrylate copolymer (weight-average molecular weight, 25,000; acid value, 35)

Carbon black: No. 33 (Mitsubishi Chemical)

Styrene-acrylic resin particles A: See below (high cohesiveness)

Styrene-acrylic resin particles B: See below (low cohesiveness)

Polyethylene wax: "NOPCOTE PEM-17" (trade name, San Nopco Ltd.)

Surfactant: "BYK348" silicone surfactant, BYK

Preparation of Styrene-Acrylic Resin Particles B

Seventy-five parts by mass of styrene, 0.8 parts by mass of acrylic acid, 14.2 parts by mass of methyl methacrylate, and 10 parts by mass of cyclohexyl methacrylate were copolymerized by emulsion polymerization, giving resin emulsion B (acid value, 7 mg KOH/g). The surfactant for emulsion polymerization was Newcol NT-30 (Nippon Nyukazai Co., Ltd.), and its amount was 2 parts by mass in a total amount of 100 parts by mass of the monomers.

Preparation of Styrene-Acrylic Resin Particles A

Resin emulsion A (acid value, 30 mg KOH/g) was obtained in the same way, except that the proportions of the monomers were changed. The amount of the surfactant for emulsion polymerization was 1 part by mass in a total amount of 100 parts by mass of the monomers.

Preparation of Pigment Dispersions

White Pigment Dispersion with Resin A

First, 12 parts by mass of an anionic acrylic acid-acrylate copolymer (weight-average molecular weight, 25,000; acid value, 25) as a resin dispersant was dissolved in a solution of 0.1 parts by mass of 30% aqueous ammonia (neutralizing agent) in 155 parts by mass of deionized water. Forty parts by mass of titanium dioxide (C.I. Pigment White 6), which is a white pigment, was dispersed in the resulting solution with zirconia beads in a ball mill for 10 hours. Impurities, such as coarse particles and debris, were removed by centrifugal filtration, and the concentration of the white pigment was adjusted to 20% by mass. In this way, a liquid dispersion of a white colorant was obtained. The diameter of particles of the white pigment was 350 nm as an average diameter.

White Pigment Dispersion with Resin B

A liquid dispersion of a white colorant was obtained in the same way, except that the resin dispersant was an acrylic-acrylate copolymer (weight-average molecular weight, 25,000; acid value, 0). The diameter of particles of the white pigment was 350 nm as an average diameter.

Non-White Pigment Dispersion, with Resin C

A liquid dispersion of a non-white colorant (black) was obtained in the same way, except that the resin dispersant was an acrylic acid-acrylate copolymer (weight-average molecular weight, 25,000; acid value, 35), that the colorant was carbon black, and that the amount of the resin dispersant was such that the ratio by mass between the pigment and the resin dispersant would be as in Table 1. The diameter of particles of the pigment was 60 nm as an average diameter.

3.2. Evaluations 3.2.1. Thickening Factor

Each ink was mixed with a 7% by mass aqueous solution of calcium formate in a ratio by mass of 10:1, the resulting mixture was stirred for 1 minute, and then the viscosity was measured using a rheometer (MCR302, Anton Paar) under the conditions of 25° C. and a shear rate of 200 s$^{-1}$. The "Reactivity with test solution (thickening factor)" in Table 1 is the factor by which the viscosity increased in the mixture from that of the ink alone.

3.2.2. Recording Tests

Each of the ink compositions and treatment liquids was loaded into a modified version of SC-R5050 ink jet printer (Seiko Epson Corporation). The arrangement of the ink jet heads was as follows: ink jet heads for the ejection of the white ink composition and the treatment liquid upstream in the direction of transport of the recording medium, and ink jet heads for the ejection of the non-white ink composition and the treatment liquid downstream. In each example or comparative example, the first and second treatment liquids were one and the same treatment liquid.

The ink jet head for the ejection of the treatment liquid upstream in the direction of transport, which was for the first treatment liquid attachment step to be performed with, was positioned side by side with the ink jet head for the ejection of the white ink composition; the white ink composition and the first treatment liquid were attached simultaneously. The ink jet heads downstream in the direction of transport, for the ejection of the non-white ink composition and the treatment liquid, were configured likewise.

The tests were conducted under the conditions set forth in Tables 2 to 5. For example, in Example 1, the treatment liquid and the white ink composition were ejected in this order in one pass and simultaneously, and then the treatment liquid and the non-white ink composition in this order in one pass and simultaneously. The platen heater was off in Example 1. In the other examples and comparative examples, too, the recording job was carried out under the recording conditions given in Tables 2 to 5. In Examples 9 and 18, a primary heating step was performed using the platen heater. In Example 16, the number of passes was four. In Example 17, the arrangement of the ink jet heads was as follows, and the liquids were attached in the same order: an ink jet head for the first treatment liquid attachment step, an ink jet head for the ejection of the white ink composition, an ink jet head for the second treatment liquid attachment step, and an ink jet head for the ejection of the non-white ink composition, from upstream to downstream in the direction of transport of the recording medium.

The recording resolution was basically 1200×1200 dpi, and the number of droplets per pixel was adjusted so that the attachment densities would be as in Tables 2 to 5. The secondary heating was performed by heating the recording medium to 70° C. with a secondary heater provided downstream in the direction of transport of the recording medium. The recording medium was PET 50A (Lintec).

3.2.3. Image Completeness/Pinholes

A solid image area of the recording was visually inspected under a fluorescent lamp and graded according to the criteria below. The grading for the white ink was made in a portion of the recorded pattern to which the white ink composition and the first treatment liquid had been attached but the non-white ink composition and the second treatment liquid had not. The grading for the non-white ink was made in a portion of the recorded pattern to which the white ink composition and the first treatment liquid had been attached and the non-white ink composition and the second treatment liquid had been attached to overlap them.

A: There is no unrecorded area or pinhole.
B: Some unrecorded areas and pinholes are seen.
C: Unrecorded areas and pinholes are noticeable.

3.2.4. Density Unevenness

A solid image area of the recording was visually inspected under a fluorescent lamp and graded according to the criteria below.

The recording pattern used for the grading for the white ink and that for the grading for the non-white ink were the same as in the evaluation of completeness/pinholes.

A: There is no bleed (unevenness in density).
B: Some bleed (unevenness in density) is seen.
C: Bleed (unevenness in density) is noticeable.

3.2.5. Three-Point Characters

White Characters

A solid white image was recorded, and then a solid non-white image was recorded thereon leaving portions of the white image unpainted so that white characters (3 pts) would appear. The boundaries between the white and non-white inks were observed and graded according to the criteria below. The results are presented in the White columns in the Tables.

A: There is no trace of color running into the white characters.
B: There are some traces of color running into the white characters.
C: Traces of color running into the white characters are evident.

Non-White Characters

Characters (3 pts) were recorded with the non-white ink on a solid white image, and the lines in non-white characters were examined for thinning and breakage.

The non-white characters were graded according to the criteria below. The results are presented in the Non-white columns in the Tables.

A: The non-white characters on the white background are clearly legible.
B: Some lines in the non-white characters on the white background are broken.
C: Broken lines are noticeable in the non-white characters on the white background.

3.2.6. Abrasion Resistance

Using a recorded test pattern, abrasion resistance was evaluated as follows. The recording medium in this evaluation was GIY 43R5 (Lintec Sign System's transparent polyvinyl chloride). The secondary heating was drying in a ° C. environment for 10 minutes. The recording pattern used for the grading for the white ink and that for the grading for the non-white ink were the same as in the evaluation of completeness/pinholes.

A: In a color fastness abrasion test using a type II tester, rubbing the image ten times with a load of 500 g does not cause transfer of the ink.
B: In a color fastness abrasion test using a type II tester, rubbing the image ten times with a load of 500 g causes transfer of the ink, but the affected area is 10% or less of the tested area.
C: In a color fastness abrasion test using a type II tester, rubbing the image ten times with a load of 500 g causes transfer of the ink, and the affected area is 10% or more of the tested area.

3.2.7. Ejection Stability

An image was recorded continuously for 1 hour under conditions for image formation. After the recording job, nozzles in the ejection nozzle assembly were inspected. The total number of defective nozzles, or nozzles that failed to eject the ink, was divided by the total number of nozzles, and the percentage was graded according to the criteria below. The results are presented in the Tables.

A: The percentage of defective nozzles was 1.0% or less.
B: The percentage of defective nozzles was more than 1.0% and 2.0% or less.
C: The percentage of defective nozzles was more than 2.0% and 5.0% or less.

TABLE 2

| | Example 1 | | | Example 2 | | | Example 3 | | | Example 4 | | |
|---|---|---|---|---|---|---|---|---|---|---|---|---|
| | Treatment liquid | White | Non-white | Treatment liquid | White | Non-white | Treatment liquid | White | Non-white | Treatment liquid | White | Non-white |
| Formula | R1 | W1 | C1 | R2 | W1 | C1 | R3 | W1 | C1 | R1 | W3 | C1 |
| Recording medium surface temperature | | 25° C. | | | 25° C. | | | 25° C. | | | 25° C. | |
| White    Iw [ng/dot] | 3.0 | 13.0 | — | 3.0 | 13.0 | — | 3.0 | 13.0 | — | 3.0 | 13.0 | — |

TABLE 2-continued

| | | Treatment liquid | White | Non-white | Treatment liquid | White | Non-white | Treatment liquid | White | Non-white | Treatment liquid | White | Non-white |
|---|---|---|---|---|---|---|---|---|---|---|---|---|---|
| attachment | Attachment density [mg/inch²] | 1.1 | 15.0 | — | 1.1 | 15.0 | — | 1.1 | 15.0 | — | 1.1 | 15.0 | — |
| | Number of passes | 1 (simultaneous) | | | 1 (simultaneous) | | | 1 (simultaneous) | | | 1 (simultaneous) | | |
| Non-white | lw [ng/dot] | 3.0 | — | 6.0 | 3.0 | — | 6.0 | 3.0 | — | 6.0 | 3.0 | — | 6.0 |
| attachment | Attachment density [mg/inch²] | 0.5 | — | 6.9 | 0.5 | — | 6.9 | 0.5 | — | 6.9 | 0.5 | — | 6.9 |
| | Number of passes | 1 (simultaneous) | | | 1 (simultaneous) | | | 1 (simultaneous) | | | 1 (simultaneous) | | |
| Image completeness/Pinholes | | — | A | A | — | B | A | — | A | A | — | A | B |
| Density unevenness | | — | A | A | — | A | A | — | B | B | — | B | A |
| Three-point characters | | — | A | A | — | A | B | — | B | A | — | B | B |
| Abrasion resistance | | — | A | A | — | A | A | — | A | A | — | A | A |
| Ejection stability | | A | A | A | A | A | A | A | A | A | A | A | A |

| | | Example 5 | | | Example 6 | | | Example 7 | | | Example 8 | | |
|---|---|---|---|---|---|---|---|---|---|---|---|---|---|
| | | Treatment liquid | White | Non-white | Treatment liquid | White | Non-white | Treatment liquid | White | Non-white | Treatment liquid | White | Non-white |
| Formula | | R1 | W1 | C1 | R1 | W1 | C1 | R1 | W1 | C2 | R1 | W4 | C1 |
| Recording medium surface temperature | | 25° C. | | | 25° C. | | | 25° C. | | | 25° C. | | |
| White attachment | lw [ng/dot] | 3.0 | 13.0 | — | 7.5 | 13.0 | — | 3.0 | 13.0 | — | 3.0 | 13.0 | — |
| | Attachment density [mg/inch²] | 1.1 | 8.0 | — | 1.1 | 15.0 | — | 1.1 | 15.0 | — | 1.1 | 15.0 | — |
| | Number of passes | 1 (simultaneous) | | | 1 (simultaneous) | | | 1 (simultaneous) | | | 1 (simultaneous) | | |
| Non-white attachment | lw [ng/dot] | 3.0 | — | 6.0 | 7.5 | — | 6.0 | 3.0 | — | 6.0 | 3.0 | — | 6.0 |
| | Attachment density [mg/inch²] | 0.5 | — | 6.9 | 0.5 | — | 6.9 | 0.5 | — | 6.9 | 0.5 | — | 6.9 |
| | Number of passes | 1 (simultaneous) | | | 1 (simultaneous) | | | 1 (simultaneous) | | | 1 (simultaneous) | | |
| Image completeness/Pinholes | | — | B | A | — | B | B | — | A | A | — | A | B |
| Density unevenness | | — | A | A | — | A | A | — | A | B | — | A | A |
| Three-point characters | | — | A | A | — | A | A | — | A | B | — | A | B |
| Abrasion resistance | | — | A | A | — | B | B | — | A | A | — | A | A |
| Ejection stability | | A | A | A | A | A | A | A | A | A | A | A | A |

TABLE 3

| | | Example 9 | | | Example 10 | | | Example 11 | | | Example 12 | | |
|---|---|---|---|---|---|---|---|---|---|---|---|---|---|
| | | Treatment liquid | White | Non-white | Treatment liquid | White | Non-white | Treatment liquid | White | Non-white | Treatment liquid | White | Non-white |
| Formula | | R1 | W1 | C1 | R1 | W1 | C1 | R1 | W1 | C1 | R1 | W1 | C1 |
| Recording medium surface temperature | | 45° C. | | | 25° C. | | | 25° C. | | | 25° C. | | |
| White attachment | lw [ng/dot] | 3.0 | 13.0 | — | 3.0 | 13.0 | — | 3.0 | 13.0 | — | 3.0 | 13.0 | — |
| | Attachment density [mg/inch²] | 1.1 | 15.0 | — | 2.5 | 15.0 | — | 0.6 | 15.0 | — | 1.4 | 15.0 | — |
| | Number of passes | 1 (simultaneous) | | | 1 (simultaneous) | | | 1 (simultaneous) | | | 1 (simultaneous) | | |
| Non-white attachment | lw [ng/dot] | 3.0 | — | 6.0 | 3.0 | — | 6.0 | 3.0 | — | 6.0 | 3.0 | — | 6.0 |
| | Attachment density [mg/inch²] | 0.5 | — | 6.9 | 0.5 | — | 6.9 | 0.5 | — | 6.9 | 0.5 | — | 6.9 |
| | Number of passes | 1 (simultaneous) | | | 1 (simultaneous) | | | 1 (simultaneous) | | | 1 (simultaneous) | | |
| Image completeness/Pinholes | | — | B | A | — | B | B | — | A | A | — | B | A |
| Density unevenness | | — | A | A | — | A | A | — | B | A | — | A | A |
| Three-point characters | | — | A | B | — | A | C | — | B | A | — | A | B |
| Abrasion resistance | | — | A | A | — | C | C | — | A | A | — | B | A |
| Ejection stability | | B | B | B | A | A | A | A | A | A | A | A | A |

| | | Example 13 | | | Example 14 | | | Example 15 | | | Example 16 | | |
|---|---|---|---|---|---|---|---|---|---|---|---|---|---|
| | | Treatment liquid | White | Non-white | Treatment liquid | White | Non-white | Treatment liquid | White | Non-white | Treatment liquid | White | Non-white |
| Formula | | R1 | W1 | C1 | R1 | W1 | C1 | R1 | W1 | C1 | R1 | W1 | C1 |
| Recording medium surface temperature | | 25° C. | | | 25° C. | | | 25° C. | | | 25° C. | | |
| White attachment | lw [ng/dot] | 3.0 | 13.0 | — | 3.0 | 13.0 | — | 3.0 | 13.0 | — | 3.0 | 13.0 | — |
| | Attachment density [mg/inch²] | 1.1 | 15.0 | — | 1.1 | 15.0 | — | 2.2 | 15.0 | — | 0.6 | 15.0 | — |
| | Number of passes | 1 (simultaneous) | | | 1 (simultaneous) | | | 1 (simultaneous) | | | 4 (simultaneous) | | |
| Non-white attachment | lw [ng/dot] | 3.0 | — | 6.0 | 3.0 | — | 6.0 | 3.0 | — | 6.0 | 3.0 | — | 6.0 |
| | Attachment density [mg/inch²] | 0.5 | — | 6.9 | 0.7 | — | 6.9 | 1.0 | — | 6.9 | 0.5 | — | 6.9 |
| | Number of passes | 1 (simultaneous) | | | 1 (simultaneous) | | | 1 (simultaneous) | | | 4 (simultaneous) | | |
| Image completeness/Pinholes | | — | A | A | — | A | B | — | B | B | — | A | A |

TABLE 3-continued

| | | | | | | | | | | | | |
|---|---|---|---|---|---|---|---|---|---|---|---|---|
| Density unevenness | — | A | B | — | A | A | — | A | A | — | A | A |
| Three-point characters | — | B | A | — | A | B | — | A | B | — | A | A |
| Abrasion resistance | — | A | A | — | A | B | — | B | B | — | A | A |
| Ejection stability | A | A | A | A | A | A | A | A | A | A | A | A |

TABLE 4

| | | Example 17 | | | Example 18 | | | Example 19 | | | Comparative Example 1 | | |
|---|---|---|---|---|---|---|---|---|---|---|---|---|---|
| | | Treatment liquid | White | Non-white | Treatment liquid | White | Non-white | Treatment liquid | White | Non-white | Treatment liquid | White | Non-white |
| Formula | | R1 | W1 | C1 | R1 | W1 | C1 | R1 | W1 | C1 | R1 | W1 | C1 |
| Recording medium surface temperature | | 45° C. | | | 30° C. | | | 25° C. | | | 25° C. | | |
| White attachment | Iw [ng/dot] | 3.0 | 13.0 | — | 3.0 | 13.0 | — | 3.0 | 13.0 | — | — | 13.0 | — |
| | Attachment density [mg/inch$^2$] | 1.1 | 15.0 | — | 2.5 | 15.0 | — | 1.1 | 11.0 | — | 0.0 | 15.0 | — |
| | Number of passes | | 1 (separate) | | | 1 (simultaneous) | | | 1 (simultaneous) | | | 1 (simultaneous) | |
| Non-white attachment | Iw [ng/dot] | 3.0 | — | 6.0 | 3.0 | — | 6.0 | 3.0 | — | 6.0 | — | — | 6.0 |
| | Attachment density [mg/inch$^2$] | 0.5 | — | 6.9 | 0.5 | — | 6.9 | 0.5 | — | 6.9 | 0.0 | — | 6.9 |
| | Number of passes | | 1 (simultaneous) | | | 1 (simultaneous) | | | 1 (simultaneous) | | | 1 (simultaneous) | |
| Image completeness/Pinholes | | — | A | A | — | B | A | — | A | A | — | A | C |
| Density unevenness | | — | A | B | — | A | A | — | A | B | — | C | C |
| Three-point characters | | — | B | A | — | A | B | — | A | A | — | C | C |
| Abrasion resistance | | — | A | A | — | A | A | — | A | A | — | A | A |
| Ejection stability | | A | A | A | A | B | A | A | A | A | A | A | A |

| | | Comparative Example 2 | | | Comparative Example 3 | | | Comparative Example 4 | | |
|---|---|---|---|---|---|---|---|---|---|---|
| | | Treatment liquid | White | Non-white | Treatment liquid | White | Non-white | Treatment liquid | White | Non-white |
| Formula | | R1 | W1 | C1 | R1 | W2 | C1 | R1 | W2 | C1 |
| Recording medium surface temperature | | 25° C. | | | 25° C. | | | 25° C. | | |
| White attachment | Iw [ng/dot] | 3.0 | 13.0 | — | 3.0 | 13.0 | — | 3.0 | 13.0 | — |
| | Attachment density [mg/inch$^2$] | 1.1 | 15.0 | — | 1.1 | 15.0 | — | 2.5 | 15.0 | — |
| | Number of passes | | 1 (simultaneous) | | | 1 (simultaneous) | | | 4 (simultaneous) | |
| Non-white attachment | Iw [ng/dot] | 3.0 | — | 6.0 | 3.0 | — | 6.0 | 3.0 | — | 6.0 |
| | Attachment density [mg/inch$^2$] | 1.5 | — | 6.9 | 0.5 | — | 6.9 | 0.5 | — | 6.9 |
| | Number of passes | | 1 (simultaneous) | | | 1 (simultaneous) | | | 4 (simultaneous) | |
| Image completeness/Pinholes | | — | A | C | — | A | C | — | A | C |
| Density unevenness | | — | A | A | — | C | C | — | C | A |
| Three-point characters | | — | A | C | — | A | C | — | C | C |
| Abrasion resistance | | — | A | C | — | A | A | — | A | B |
| Ejection stability | | A | A | A | A | A | A | A | A | A |

TABLE 5

| | | Comparative Example 5 | | | Comparative Example 6 | | | Comparative Example 7 | | |
|---|---|---|---|---|---|---|---|---|---|---|
| | | Treatment liquid | White | Non-white | Treatment liquid | White | Non-white | Treatment liquid | White | Non-white |
| Formula | | R1 | W1 | C1 | R1 | W1 | C1 | R1 | W1 | C1 |
| Recording medium surface temperature | | 25° C. | | | 25° C. | | | 25° C. | | |
| White attachment | Iw [ng/dot] | 3.0 | 13.0 | — | 3.0 | 13.0 | — | 3.0 | 13.0 | — |
| | Attachment density [mg/inch$^2$] | 0.8 | 11.0 | — | 2.8 | 15.0 | — | 1.6 | 15.0 | — |
| | Number of passes | | 1 (simultaneous) | | | 1 (simultaneous) | | | 1 (simultaneous) | |
| Non-white attachment | Iw [ng/dot] | 3.0 | — | 6.0 | — | — | 6.0 | — | — | 6.0 |
| | Attachment density [mg/inch$^2$] | 0.8 | — | 11.0 | — | — | 6.9 | — | — | 6.9 |
| | Number of passes | | 1 (simultaneous) | | | 1 (simultaneous) | | | 1 (simultaneous) | |
| Image completeness/Pinholes | | — | A | B | — | C | A | — | B | A |
| Density unevenness | | — | B | C | — | A | C | — | A | C |
| Three-point characters | | — | B | B | — | C | B | — | C | A |
| Abrasion resistance | | — | A | A | — | B | B | — | B | A |
| Ejection stability | | A | A | A | A | A | A | A | A | A |

TABLE 5-continued

| | Comparative Example 8 | | | Comparative Example 9 | | | Comparative Example 10 | | |
|---|---|---|---|---|---|---|---|---|---|
| | Treatment liquid | White | Non-white | Treatment liquid | White | Non-white | Treatment liquid | White | Non-white |
| Formula | R1 | W1 | C1 | R1 | W1 | C1 | R1 | W1 | C1 |
| Recording medium surface temperature | 25° C. | | | 25° C. | | | 25° C. | | |
| White attachment  Iw [ng/dot] | 3.0 | 13.0 | — | 3.0 | 13.0 | — | 3.0 | 13.0 | — |
| Attachment density [mg/inch$^2$] | 1.1 | 15.0 | — | 1.1 | 15.0 | — | 1.1 | 15.0 | — |
| Number of passes | 1 (simultaneous) | | | 1 (simultaneous) | | | 1 (simultaneous) | | |
| Non-white attachment  Iw [ng/dot] | — | — | 6.0 | 3.0 | — | 6.0 | 3.0 | — | 6.0 |
| Attachment density [mg/inch$^2$] | — | — | 6.9 | 1.1 | — | 6.9 | 0.8 | — | 6.9 |
| Number of passes | 1 (simultaneous) | | | 1 (simultaneous) | | | 1 (simultaneous) | | |
| Image completeness/Pinholes | — | A | A | — | A | C | — | A | C |
| Density unevenness | — | A | C | — | A | A | — | B | A |
| Three-point characters | — | C | A | — | A | C | — | B | B |
| Abrasion resistance | — | A | A | — | A | B | — | A | A |
| Ejection stability | A | A | A | A | A | A | A | A | A |

3.3. Evaluation Results

The evaluations revealed that the recording methods of the examples, in which the white ink composition experienced not less than five-fold increase in viscosity when mixed with a 7% by mass aqueous solution of calcium formate in a ratio by mass of 10:1 and in which the attachment density of the treatment liquid in the second treatment liquid attachment step was lower than that in the first treatment liquid attachment step, help improve the quality of the image formed by the white ink composition and limit bleed-related unevenness in the image formed by the non-white ink composition. It was also found that these recording methods help limit the thinning of lines in the image formed by the non-white ink composition.

The present disclosure embraces configurations substantially identical to those described in the embodiments, such as configurations identical in function, methodology, and results to or having the same goal and offering the same advantages as the described ones. The present disclosure also includes configurations created by changing any non-essential part of those described in the embodiments. The present disclosure, furthermore, encompasses configurations identical in operation and effect to or capable of fulfilling the same purposes as those described in the embodiments. Configurations obtained by adding a known technology to those described in the embodiments are also part of the present disclosure.

From the embodiments and variations described above, the following is derived.

A recording method includes:
a white ink attachment step, in which a white ink composition containing a white colorant is attached to a recording medium;
a non-white ink attachment step, in which a non-white ink composition containing a non-white colorant is attached to overlap the attached white ink composition;
a first treatment liquid attachment step, accompanying the white ink attachment step and in which a treatment liquid containing a flocculant is attached to the recording medium; and
a second treatment liquid attachment step, accompanying the non-white ink attachment step and in which a treatment liquid containing a flocculant is attached to the recording medium, wherein
the white ink composition experiences a five-fold or greater increase in viscosity when mixed with a 7% by mass aqueous solution of calcium formate in a ratio by mass of the white ink composition to the aqueous solution of calcium formate; and
the attachment density of the treatment liquid in the second treatment liquid attachment step is lower than that in the first treatment liquid attachment step.

In this recording method, a treatment liquid is attached not only in a first treatment liquid attachment step, which accompanies the attachment of a white ink composition, but also in a second treatment liquid attachment step, which accompanies the attachment of a non-white ink composition. This helps improve the quality of the image formed by the white ink composition and also helps limit unevenness caused by ink bleed (bleed-related unevenness) in the image formed by the non-white ink composition.

The attachment density of the treatment liquid in the second treatment liquid attachment step, furthermore, is lower than that in the first treatment liquid attachment step. The amount of treatment liquid attached in the second treatment liquid attachment step, therefore, cannot be greater than is needed for causing the relevant ingredient(s) in the non-white ink composition to aggregate. This precludes overaggregation of the relevant ingredient(s) in the non-white ink composition, thereby helping limit the thinning of lines in the image formed by the non-white ink composition.

In the above recording method,
the attachment density of the treatment liquid in the first treatment liquid attachment step may be 0.4 mg/inch$^2$ or more and 2.5 mg/inch$^2$ or less.

In this recording method, bleed-related unevenness and the thinning of fine lines in the image formed by the non-white ink composition are further reduced, but the quality of the image formed by the white ink composition is maintained sufficiently high.

In the above recording method,
the attachment density of the treatment liquid in the second treatment liquid attachment step may be 2.5 mg/inch$^2$ or less.

In this recording method, bleed-related unevenness and the thinning of fine lines in the image formed by the non-white ink composition are further reduced.

In the above recording method,
the white ink composition may contain a white pigment as the white colorant and an anionic dispersant resin.

In this recording method, the dispersion and aggregation of the white pigment are better; dispersion stability, therefore, is even better, and the resulting image is of better quality.

In the above recording method,
the attachment density of the white ink composition in the white ink attachment step may be 9.0 mg/inch$^2$ or more.

In this recording method, the white image is even better.

In the above recording method,
the white ink attachment step may be performed in such a manner that the area to which the ink can be attached in one scan is finished in one scan, and the non-white ink attachment step may be performed in such a manner that the area to which the ink can be attached in one scan is finished in one scan.

In this recording method, the recording speed in the recording job is better.

In the above recording method,
the first treatment liquid attachment step may be performed in the same scan as the white ink attachment step; and
the second treatment liquid attachment step may be performed in the same scan as the non-white ink attachment step.

In this recording method, the recording speed in the recording job is better.

In the above recording method,
the total attachment density of the treatment liquid attached in the first treatment liquid attachment step and that attached in the second treatment liquid attachment step may be 4.0 mg/inch$^2$ or less.

In this recording method, incompleteness of the image formed by the white ink composition is further reduced.

In the above recording method,
the white ink attachment step, the first treatment liquid attachment step, the non-white ink attachment step, and the second treatment liquid attachment step may be performed using ink jet technology.

In the above recording method,
the first treatment liquid attachment step and the second treatment liquid attachment step may be performed using ink jet technology; and
the mass of multiple droplets of the treatment liquids in the first and second treatment liquid attachment steps may be 7 ng or less.

In this recording method, the chance of contact between the treatment liquids and the inks on the recording medium is increased.

In the above recording method,
the non-white ink composition may experience a five-fold or greater increase in viscosity when mixed with a 7% by mass aqueous solution of calcium formate in a ratio by mass of 10:1, the non-white ink composition to the aqueous solution of calcium formate.

In this recording method, the quality of the white image is better.

In the above recording method,
the surface tension of the treatment liquid in the first treatment liquid attachment step and that of the treatment liquid in the second treatment liquid attachment step may be lower than that of the non-white ink composition; and
the surface tension of the non-white ink composition may be lower than that of the white ink composition.

The surface tension of the treatment liquids used in the treatment liquid attachment steps, furthermore, may be lower than that of the non-white ink composition, and the surface tension of the non-white ink composition may be lower than that of the white ink composition. Such an arrangement improves image completeness, or reduces pinholes, because in that case the treatment liquids wet and spread on the substrate better, and the white ink on them also spreads better. It becomes, furthermore, easier to form a non-white image on the white image by virtue of higher wettability/spreadability of the non-white ink composition than that of the white ink composition.

In the above recording method,
the maximum attachment density of the white ink composition in the white ink attachment step may be higher than that of the non-white ink composition in the non-white ink attachment step.

In this recording method, background masking in the recording job is better.

In the above recording method,
the surface temperature of the recording medium when the white ink composition is attached thereto in the white ink attachment step may be 30° C. or below; and
that of the recording medium when the non-white ink composition is attached thereto in the non-white ink attachment step may be 30° C. or below.

In this recording method, the aggregation of the white ink composition is further encouraged.

In the above recording method,
the white ink attachment step may include no primary heating step, and the non-white ink attachment step may include no primary heating step.

In this recording method, ejection stability is even better.

A recording apparatus includes:
an attachment mechanism with which the white ink attachment step is performed; an attachment mechanism with which the non-white ink attachment step is performed; an attachment mechanism with which the first treatment liquid attachment step is performed; and an attachment mechanism with which the second treatment liquid attachment step is performed. This recording apparatus is used to implement any of the above recording methods.

This recording apparatus attaches a treatment liquid not only in a first treatment liquid attachment step, which accompanies the attachment of a white ink composition, but also in a second treatment liquid attachment step, which accompanies the attachment of a non-white ink composition. This helps improve the quality of the image formed by the white ink composition and also helps limit bleed-related unevenness in the image formed by the non-white ink composition.

The attachment density of the treatment liquid in the second treatment liquid attachment step, furthermore, is lower than that in the first treatment liquid attachment step. The amount of treatment liquid attached in the second treatment liquid attachment step, therefore, cannot be greater than is needed for causing the relevant ingredient(s) in the non-white ink composition to aggregate. This precludes overaggregation of the relevant ingredient(s) in the non-white ink composition, thereby helping limit the thinning of lines in the image formed by the non-white ink composition. It should be noted that one and the same attachment mechanism may be the attachment mechanism with which the first treatment liquid attachment step is performed and that with which the second treatment liquid attachment step is performed.

What is claimed is:

1. A recording method comprising:
a white ink attachment step, in which a white ink composition containing a white colorant is attached to a recording medium;
a non-white ink attachment step, in which a non-white ink composition containing a non-white colorant is attached to overlap the attached white ink composition;

a first treatment liquid attachment step, accompanying the white ink attachment step and in which a treatment liquid containing a flocculant is attached to the recording medium; and a second treatment liquid attachment step, accompanying the non-white ink attachment step and in which a treatment liquid containing a flocculant is attached to the recording medium, wherein:

the white ink composition experiences a five-fold or greater increase in viscosity when mixed with a 7% by mass aqueous solution of calcium formate in a ratio by mass of 10:1, the white ink composition to the aqueous solution of calcium formate; and an attachment density of the treatment liquid in the second treatment liquid attachment step is lower than an attachment density of the treatment liquid in the first treatment liquid attachment step.

2. The recording method according to claim 1, wherein the attachment density of the treatment liquid in the first treatment liquid attachment step is 0.4 mg/inch$^2$ or more and 2.5 mg/inch$^2$ or less.

3. The recording method according to claim 1, wherein the attachment density of the treatment liquid in the second treatment liquid attachment step is 2.5 mg/inch$^2$ or less.

4. The recording method according to claim 1, wherein the white ink composition contains a white pigment as the white colorant and an anionic dispersant resin.

5. The recording method according to claim 1, wherein an attachment density of the white ink composition in the white ink attachment step is 9.0 mg/inch$^2$ or more.

6. The recording method according to claim 1, wherein the white ink attachment step is performed in such a manner that an area to which ink can be attached in one scan is finished in one scan, and the non-white ink attachment step is performed in such a manner that an area to which ink can be attached in one scan is finished in one scan.

7. The recording method according to claim 1, wherein; the first treatment liquid attachment step is performed in the same scan as the white ink attachment step; and the second treatment liquid attachment step is performed in the same scan as the non-white ink attachment step.

8. The recording method according to claim 1, wherein a total attachment density of the treatment liquid attached in the first treatment liquid attachment step and the treatment liquid attached in the second treatment liquid attachment step is 4.0 mg/inch$^2$ or less.

9. The recording method according to claim 1, wherein the white ink attachment step, the first treatment liquid attachment step, the non-white ink attachment step, and the second treatment liquid attachment step are performed using ink jet technology.

10. The recording method according to claim 1, wherein:
the first treatment liquid attachment step and the second treatment liquid attachment step are performed using ink jet technology; and a mass of a plurality of droplets of the treatment liquids in the first treatment liquid attachment step and the second treatment liquid attachment step is 7 ng or less.

11. The recording method according to claim 1, wherein the non-white ink composition experiences a five-fold or greater increase in viscosity when mixed with a 7% by mass aqueous solution of calcium formate in a ratio by mass of 10:1, the non-white ink composition to the aqueous solution of calcium formate.

12. The recording method according to claim 1, wherein:
a surface tension of the treatment liquid in the first treatment liquid attachment step and a surface tension of the treatment liquid in the second treatment liquid attachment step are lower than a surface tension of the non-white ink composition; and the surface tension of the non-white ink composition is lower than a surface tension of the white ink composition.

13. The recording method according to claim 1, wherein a maximum attachment density of the white ink composition in the white ink attachment step is higher than a maximum attachment density of the non-white ink composition in the non-white ink attachment step.

14. The recording method according to claim 1, wherein:
a surface temperature of the recording medium when the white ink composition is attached thereto in the white ink attachment step is 30° C. or below; and a surface temperature of the recording medium when the non-white ink composition is attached thereto in the non-white ink attachment step is 30° C. or below.

15. The recording method according to claim 1, wherein the white ink attachment step includes no primary heating step, and the non-white ink attachment step includes no primary heating step.

16. A recording apparatus with which the recording method according to claim 1 is implemented, the apparatus comprising:
an attachment mechanism with which the white ink attachment step is performed;

an attachment mechanism with which the non-white ink attachment step is performed:

an attachment mechanism with which the first treatment liquid attachment step is performed; and an attachment mechanism with which the second treatment liquid attachment step is performed.

* * * * *